(12) United States Patent
Umetani et al.

(10) Patent No.: US 11,093,517 B2
(45) Date of Patent: Aug. 17, 2021

(54) EVALUATION RESULT DISPLAY METHOD, EVALUATION RESULT DISPLAY APPARATUS, AND NON-TRANSITORY COMPUTER-READABLE RECORDING MEDIUM STORING EVALUATION RESULT DISPLAY PROGRAM

(71) Applicant: Panasonic Intellectual Property Corporation of America, Torrance, CA (US)

(72) Inventors: Hideo Umetani, Osaka (JP); Iku Ohama, Osaka (JP); Ryota Fujimura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 1028 days.

(21) Appl. No.: 14/671,691

(22) Filed: Mar. 27, 2015

(65) Prior Publication Data
US 2015/0286692 A1 Oct. 8, 2015

(30) Foreign Application Priority Data

Apr. 4, 2014 (JP) .............................. JP2014-077994
Dec. 1, 2014 (JP) .............................. JP2014-243108

(51) Int. Cl.
G06F 16/248 (2019.01)
G06Q 10/04 (2012.01)
(Continued)

(52) U.S. Cl.
CPC ........... G06F 16/248 (2019.01); G06N 20/00 (2019.01); G06Q 10/04 (2013.01); G06Q 30/02 (2013.01)

(58) Field of Classification Search
CPC ........... G06F 17/30554; G06F 16/9535; G06F 16/9577; G06F 16/635; G06F 16/68
See application file for complete search history.

(56) References Cited

U.S. PATENT DOCUMENTS 6,085,226 A * 7/2000 Horvitz ............... G06F 16/9574
709/203
8,843,427 B1 * 9/2014 Lin ...................... G06N 99/005
705/16

(Continued)

FOREIGN PATENT DOCUMENTS

JP 2011-117904 A 6/2011

OTHER PUBLICATIONS

Anthony K Akobeng, "Understanding diagnostic tests 3 receiver operating characteristic curves" Acta Pædiatrica 2007, pp. 644-647.

*Primary Examiner* — Angelica Ruiz
(74) *Attorney, Agent, or Firm* — Greenblum & Bernstein, P.L.C.

(57) ABSTRACT

A method is provided for reducing computer memory usage and processing time in assessing effectiveness of a prediction model. The method includes acquiring a plurality of records and sorting the records based on prediction values. The method also includes determining two of three performance data parameters, including a number of selected records and a number of correct decisions, and determining a level of effectiveness of the prediction model based on the two of three performance data parameters. The method further includes generating a graph illustrating the level of effectiveness of the prediction model based on the two of three performance parameters, and visually conveying the level of effectiveness of the prediction model utilizing the generated graph.

19 Claims, 16 Drawing Sheets

(51) Int. Cl.
*G06Q 30/02* (2012.01)
*G06N 20/00* (2019.01)

(56) References Cited

U.S. PATENT DOCUMENTS

| | | | | |
|---|---|---|---|---|
| 9,020,861 B2* | 4/2015 | Lin | ................ | G06F 17/246 706/11 |
| 9,070,089 B1* | 6/2015 | Lin | ................ | G06N 3/08 |
| 9,239,986 B2* | 1/2016 | Lin | ................ | G06Q 20/4016 |
| 9,690,933 B1* | 6/2017 | Singh | ................ | G06F 21/56 |
| 2007/0244589 A1* | 10/2007 | Oku | ................ | G06Q 10/04 700/97 |
| 2008/0033790 A1* | 2/2008 | Nickerson | ................ | G06Q 30/0203 705/7.32 |
| 2008/0313247 A1* | 12/2008 | Galvin | ................ | G06F 16/951 708/200 |
| 2009/0094196 A1* | 4/2009 | Piwowarski | ................ | G06F 16/954 |
| 2011/0131652 A1* | 6/2011 | Robinson | ................ | H04L 63/1408 726/22 |
| 2011/0173068 A1* | 7/2011 | O'Hanlon | ................ | G06Q 30/0251 705/14.52 |
| 2011/0302031 A1* | 12/2011 | Chen | ................ | G06Q 30/02 705/14.53 |
| 2012/0005192 A1* | 1/2012 | Bao | ................ | G06F 16/9558 707/721 |
| 2012/0089996 A1* | 4/2012 | Ramer | ................ | H04H 60/46 725/14 |
| 2013/0055097 A1* | 2/2013 | Soroca | ................ | G06F 16/9577 715/738 |
| 2013/0138507 A1* | 5/2013 | Kumar | ................ | G06Q 30/0251 705/14.54 |
| 2014/0068011 A1* | 3/2014 | Zhang | ................ | G06N 5/02 709/219 |
| 2015/0379429 A1* | 12/2015 | Lee | ................ | G09B 5/00 706/11 |

* cited by examiner

FIG. 4

| PRESENCE/ABSENCE OF ADVERTISEMENT BROWSING (ACTUAL RESULT) | AGE | SEX | ... | BROWSING PROBABILITY PREDICTED BY PREDICTION MODEL |
|---|---|---|---|---|
| 1 | 44 | MALE | ... | 0.645 |
| 1 | 26 | MALE | ... | 0.328 |
| 0 | 71 | MALE | ... | 0.122 |
| 0 | 60 | FEMALE | ... | 0.056 |
| 0 | 45 | MALE | ... | 0.257 |
| 1 | 54 | FEMALE | ... | 0.189 |
| 0 | 62 | FEMALE | ... | 0.095 |
| 0 | 37 | MALE | ... | 0.143 |
| 1 | 29 | FEMALE | ... | 0.290 |
| ⋮ | ⋮ | ⋮ | ... | ⋮ |

EVALUATION RESULT DISPLAY METHOD, EVALUATION RESULT DISPLAY APPARATUS, AND NON-TRANSITORY COMPUTER-READABLE RECORDING MEDIUM STORING EVALUATION RESULT DISPLAY PROGRAM

BACKGROUND

1. Technical Field

The present disclosure relates to an evaluation result display method, an evaluation result display apparatus, and a non-transitory computer-readable recording medium storing an evaluation result display program that display an evaluation result for a prediction model which predicts which group, among a plurality of groups, each of a plurality of objects belongs to.

2. Description of the Related Art

Recent years, networking has advanced and various data have come to be collected from various types of equipment via a network and accumulated. The collected data include, for example, access records to a website. The collected data include, for example, information such as purchase histories, ages, and sexes of customers. Due to advances in computing performance or the like, enormous collected data have come to be analyzed, and purchase prediction for each customer or browsing prediction on an advertisement have come to be carried out. Along with these circumstances, a method for evaluating prediction results after an analysis is carried out is increasing its importance.

Methods for evaluating prediction results that have been known thus far include a technique described in Anthony K Akobeng, "Understanding diagnostic tests 3: receiver operating characteristic curves", Acta Paediatrica, 2007, pp. 644-647 (hereinafter, referred to as NPL 1). In NPL 1, using the ROC curve is proposed. In NPL 1, a method is disclosed in which a true positive rate (a rate of outcomes in which an event has actually occurred when the event was predicted to occur, a TP rate) and a false positive rate (a rate of outcomes in which an event has not actually occurred when the event was predicted to occur, an FP rate) are calculated based on a prediction result and actual data of correct decisions, and accuracy of a prediction result is evaluated by using an ROC curve with the vertical axis representing the TP rate and the horizontal axis representing the FP rate.

SUMMARY

However, the conventional methods have a problem in that it is difficult to determine a cut-off value for significantly biased data. In other words, in order to determine a useful cut-off value, it is necessary to check all data and calculate both the TP rates and the FP rates in order, and thus a large memory capacity is required.

One non-limiting and exemplary embodiment provides an evaluation result display method, an evaluation result display apparatus, and a non-transitory computer-readable recording medium storing an evaluation result display program that make it possible to not only reduce an amount of memory usage but also easily evaluate a prediction result.

In one general aspect, the techniques disclosed here feature an evaluation result display method that displays an evaluation result for a prediction model which predicts which group, among a plurality of groups, each of a plurality of objects belongs to, and includes an acquisition step of acquiring a plurality of records which is a collection of records each of which includes a prediction value predicted by the prediction model and group information indicating a group each of the plurality of objects actually belongs to, a sorting step of sorting the plurality of records based on the prediction values, a calculation step of, with respect to the plurality of records sorted in the sorting step, selecting records sequentially in sorted order, calculating the number of selections which indicates the number of the selected records and the number of correct decisions which indicates the number of decisions in which the group information included in the selected record is decided to belong to a group classified as a correct decision among the plurality of groups, and outputting the number of selections and the number of correct decisions in association with each other, a generation step of generating a graph which is created by plotting the number of selections and the number of correct decisions output in the calculation step in a coordinate system with the horizontal axis representing the number of selections and the vertical axis representing the number of correct decisions, and a display step of displaying the graph generated in the generation step.

According to the present disclosure, it is possible to not only reduce an amount of memory usage but also evaluate a prediction result easily.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a diagram illustrating an example of input data according to the first embodiment of the present disclosure;

Figure 1:
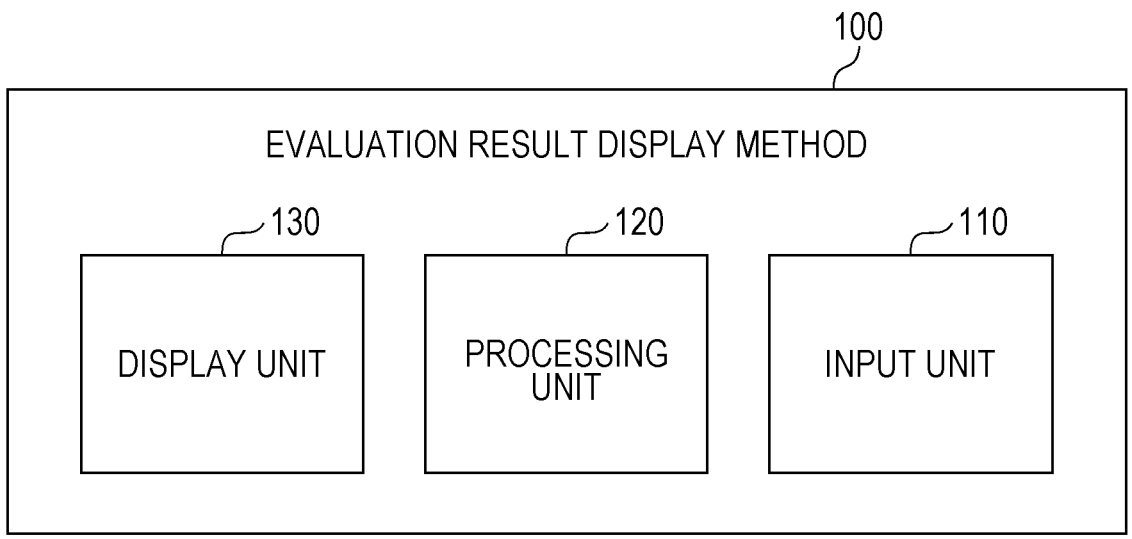
FIG. 1 is a diagram illustrating a configuration of an entire system for carrying out an evaluation result display method according to a first embodiment of the present disclosure.

DETAILED DESCRIPTION (Underlying Knowledge Forming Basis of the Present Disclosure)

The inventors have found that the above-described evaluation method has the following problem.

The conventional method is a method in which an appropriate cut-off value is set, a TP rate and an FP rate for an actual result are calculated, and the TP rate and the FP rate are plotted on a graph. If an area on the lower side of the graph is large, it is possible to decide that a prediction by use of the value is useful.

However, in the conventional method, it is necessary to choose a cut-off value appropriately when an evaluation result is to be displayed. In particular, when data are significantly biased, it is difficult to determine an appropriate cut-off value. For example, a method is conceivable in which all data are checked in order and then a cut-off value is determined. In such a method, both TP rates and FP rates have to be calculated with respect to all manners of selection of data and both of the calculated values have to be stored, causing a significant increase in an amount of memory usage.

In order to solve such a problem, an evaluation result display method according to an aspect of the present disclosure is an evaluation result display method that displays an evaluation result for a prediction model which predicts which group, among a plurality of groups, each of a plurality of objects belongs to, and includes an acquisition step of acquiring a plurality of records which is a collection of records each of which includes a prediction value predicted by the prediction model and group information indicating a group each of the plurality of objects actually belongs to, a sorting step of sorting the plurality of records based on the prediction values, a calculation step of, with respect to the plurality of records sorted in the sorting step, selecting records sequentially in sorted order, calculating the number of selections which indicates the number of the selected records and the number of correct decisions which indicates the number of decisions in which the group information included in the selected record is decided to belong to a group classified as a correct decision among the plurality of groups, and outputting the number of selections and the number of correct decisions in association with each other, a generation step of generating a graph which is created by plotting the number of selections and the number of correct decisions output in the calculation step in a coordinate system with the horizontal axis representing the number of selections and the vertical axis representing the number of correct decisions, and a display step of displaying the graph generated in the generation step.

The evaluation result display method according to the aspect is able to display an evaluation of a prediction result appropriately in a graph by calculating only the number of selections and the number of correct decisions. With this method, compared with a conventional evaluation result display method in which all data are checked and both TP rates and FP rates are calculated in order, it is possible to reduce an amount of memory usage required for a calculation of an evaluation result.

The evaluation result display method according to the aspect makes it possible to not only reduce an amount of memory usage but also shorten processing time in an evaluation of a prediction result, in particular, for significantly biased data.

More specifically, because it is sufficient to store only the number of selections and the number of correct decisions in a memory area, and a calculation of the number of wrong decisions is not required, it is possible to reduce an amount of memory usage. In other words, although, in a conventional evaluation result display method, it is required to store three parameters, namely the number of selections, the number of correct decisions, and the number of wrong decisions, in a memory, in the evaluation result display method of the aspect, it is sufficient to store only two parameters, the number of selections and the number of correct decisions, in the memory, making it possible to reduce an amount of memory usage required for a calculation of an evaluation result.

The prediction value may include a prediction probability which indicates a probability of belonging to a group classified as the correct decision among the plurality of groups, and the sorting step may sort the plurality of records in descending order of the prediction probability or in ascending order of the prediction probability.

With this configuration, it is possible to sort a plurality of records in descending order of the prediction probability or in ascending order of the prediction probability.

The generation step may plot a line which links a point at which the number of selections takes 0 and the number of correct decisions takes 0 with a point at which the number of selections takes a maximum value and the number of correct decisions takes a maximum value in the coordinate system.

With this configuration, the line, which links a point at which the number of selections takes 0 and the number of correct decisions takes 0 with a point at which the number of selections takes a maximum value and the number of correct decisions takes a maximum value, expresses the number of selections and the number of correct decisions when data are selected at random. Thus, it is possible to display a graph expressing the number of selections and the number of correct decisions when data are selected at random with a graph expressing an evaluation result for a prediction model and to compare the two graphs.

The calculation step may select a predetermined number of the records at a time and calculate the number of selections of the predetermined number of the selected records and the number of correct decisions of the predetermined number of the selected records.

With this configuration, because a predetermined number of records are selected at a time and the number of selections of the predetermined number of the selected records and the number of correct decisions of the predetermined number of the selected records are calculated, it is possible to shorten time required for calculation processing.

The calculation step may select, among a plurality of records sorted in the sorting step, all records that have the same prediction value in sorted order and calculate the number of selections of the selected records having the same prediction value and the number of correct decisions of the selected records having the same prediction value.

With this configuration, because, among a plurality of sorted records, all records that have the same prediction value are selected in sorted order and the number of selections of the selected records having the same prediction value and the number of correct decisions of the selected records having the same prediction value are calculated, it is possible to further reduce an amount of memory.

The evaluation result display method according to the aspect may further include an area calculation step of calculating an area ratio of an area on the lower side of the graph which is generated in the generation step to a total area calculated by multiplying a maximum value of the number of selections by a maximum value of the number of correct decisions, and outputting the calculated value of the area ratio.

With this configuration, it is possible, by using the number of selections and the number of correct decisions calculated to display a graph of an evaluation result, to calculate an area ratio of an area on the lower side of the graph to a total area calculated by multiplying a maximum value of the number of selections by a maximum value of the number of correct decisions, and use the calculated area ratio as an index to objectively evaluate a prediction model. It is possible to judge that a prediction model with a large area ratio is a better prediction model than a prediction model with a small area ratio. Because numerical values, namely area ratios, are compared, it becomes possible to evaluate a prediction model objectively.

The evaluation result display method according to the aspect may further include an optimum value calculation step of calculating the number of selections of a point on the graph at which the slope of a line that links a point at which the number of selections takes 0 and the number of correct decisions takes 0 with a point at which the number of selections takes a maximum value and the number of the correct decisions takes a maximum value coincides with the slope of the generated graph as an optimum value by using the number of selections and the number of correct decisions output in the calculation step, and outputting the calculated optimum value.

With this configuration, it is possible to calculate the number of selections making the agreement rate with an actual result maximum as an optimum value by using the number of selections and the number of correct decisions calculated to display a graph of an evaluation result. Using the number of selections and the number of correct decisions makes it possible to reduce an amount of memory used for a calculation of the optimum value. Using this optimum value makes it possible to identify a prediction model with the highest rate of correct decision.

An evaluation result display apparatus according to another aspect of the present disclosure is an evaluation result display apparatus that displays an evaluation result for a prediction model which predicts which group, among a plurality of groups, each of a plurality of objects belongs to, and includes an acquirer that acquires a plurality of records which is a collection of records each of which includes a prediction value predicted by the prediction model and group information indicating a group each of the plurality of objects actually belongs to, a storage that stores the plurality of records acquired by the acquirer, a sorter that reads out the plurality of records stored in the storage and sorts the read-out plurality of records based on the prediction values, a calculator that, with respect to the plurality of records sorted by the sorter, selects records sequentially in sorted order, calculates the number of selections which indicates the number of the selected records and the number of correct decisions which indicates the number of decisions in which the group information included in the selected record is decided to belong to a group classified as a correct decision among the plurality of groups, and outputs the number of selections and the number of correct decisions in association with each other, a generator that generates a graph which is created by plotting the number of selections and the number of correct decisions output by the calculator in a coordinate system with the horizontal axis representing the number of selections and the vertical axis representing the number of correct decisions, and an outputter that outputs the graph generated by the generator.

The evaluation result display apparatus according to the aspect is able to appropriately display an evaluation of a prediction result in a graph by calculating only the number of selections and the number of correct decisions. With this configuration, compared with a conventional evaluation result display method in which all data are checked and both TP rates and FP rates are calculated in order, it is possible to reduce an amount of memory usage required for a calculation of an evaluation result.

The evaluation result display apparatus according to the aspect makes it possible to not only reduce an amount of memory usage but also shorten processing time in the evaluation of a prediction result, in particular, for significantly biased data.

More specifically, because it is sufficient to store only the number of selections and the number of correct decisions in a memory area and it is not required to calculate the number of wrong decisions, it is possible to reduce an amount of memory usage. In other words, although, in a conventional evaluation result display method, it is required to store three parameters, namely the number of selections, the number of correct decisions, and the number of wrong decisions, in the evaluation result display method of the aspect, it is sufficient to store two parameters, the number of selections and the number of correct decisions, in the memory, making it possible to reduce an amount of memory usage required for a calculation of an evaluation result.

A non-transitory computer-readable recording medium according to another aspect of the present disclosure stores an evaluation result display program that displays an evaluation result for a prediction model which predicts which group, among a plurality of groups, each of a plurality of objects belongs to, the evaluation result display program causing a computer to function as an acquirer that acquires a plurality of records which is a collection of records each of which includes a prediction value predicted by the prediction model and group information indicating a group each of the plurality of objects actually belongs to, a storage that stores the plurality of records acquired by the acquirer, a sorter that reads out the plurality of records stored in the storage and sorts the read-out plurality of records based on the prediction values, a calculator that, with respect to the plurality of records sorted by the sorter, selects records sequentially in sorted order, calculates the number of selections which indicates the number of selected records and the number of correct decisions which indicates the number of decisions in which the group information included in the selected record is decided to belong to a group classified as a correct decision among the plurality of groups, and outputs the number of selections and the number of correct decisions in association with each other, a generator that generates a graph which is created by plotting the number of selections and the number of correct decisions output by the calculator in a coordinate system with the horizontal axis representing the number of selections and the vertical axis representing the number of correct decisions, and an outputter that outputs the graph generated by the generator.

The non-transitory computer-readable recording medium storing the evaluation result display program according to the aspect makes it possible to appropriately display an evaluation of a prediction result in a graph by calculating only the number of selections and the number of correct decisions. With this configuration, compared with a conventional evaluation result display method in which all data are checked and then both TP rates and FP rates are calculated in order, it is possible to reduce an amount of memory usage required for a calculation of an evaluation result.

The non-transitory computer-readable recording medium storing the evaluation result display program according to the aspect makes it possible to not only reduce an amount of memory usage but also shorten processing time in an evaluation of a prediction result, in particular, for significantly biased data.

More specifically, because it is sufficient to store only the number of selections and the number of correct decisions in a memory area, and it is not required to calculate the number of wrong decisions, it is possible to reduce an amount of memory usage. In other words, although, in a conventional evaluation result display method, it is required to store three parameters, namely the number of selections, the number of correct decisions, and the number of wrong decisions in a memory, in the evaluation result display method of the aspect, it is sufficient to store only two parameters, the number of selections and the number of correct decisions, in the memory, and it is thus possible to reduce an amount memory usage required for a calculation of an evaluation result.

It should be noted that these general or specific aspects may be implemented as an apparatus, a system, a method, an integrated circuit, a computer program, a recording medium such as a computer-readable CD-ROM, or any selective combination thereof.

First Embodiment

An evaluation result display method, an evaluation result display apparatus, and a system for carrying out the evaluation result display method according to embodiments of the present disclosure will be described below specifically with reference to the accompanying drawings. Any of the embodiments which will be described below shows a general or specific example. Numerical values, shapes, materials, components, arrangement positions of the components, connection configurations of the components, steps, an order of the steps, and so on which will be described in the following embodiments are only an example and not intended to limit the present disclosure. Components not referred to in an independent claim that indicates the most generic concept among components in the following embodiments will be described as an arbitrary component.

1.1 Configuration of Entire System

FIG. 1 is a diagram illustrating a configuration of an entire system for carrying out an evaluation result display method according to a first embodiment of the present disclosure. FIG. 1 illustrates a case in which a system for carrying out the evaluation result display method is configured as an apparatus. An evaluation result display apparatus 100 includes an input unit 110, a processing unit 120, and a display unit 130.

The evaluation result display apparatus 100 is, for example, an information processing apparatus that is configured with a server, a personal computer, a smart phone, a feature phone, a tablet-type computer, or the like and equipped with a calculation function.

The input unit 110 is configured with, for example, a keyboard of a personal computer or a touch panel of a tablet-type computer and receives input from a user.

The processing unit 120 is configured with, for example, a processor or a memory built into a personal computer.

The display unit 130 is configured with, for example, a display panel such as a monitor of a personal computer and a display of a tablet-type computer.

Figure 2:
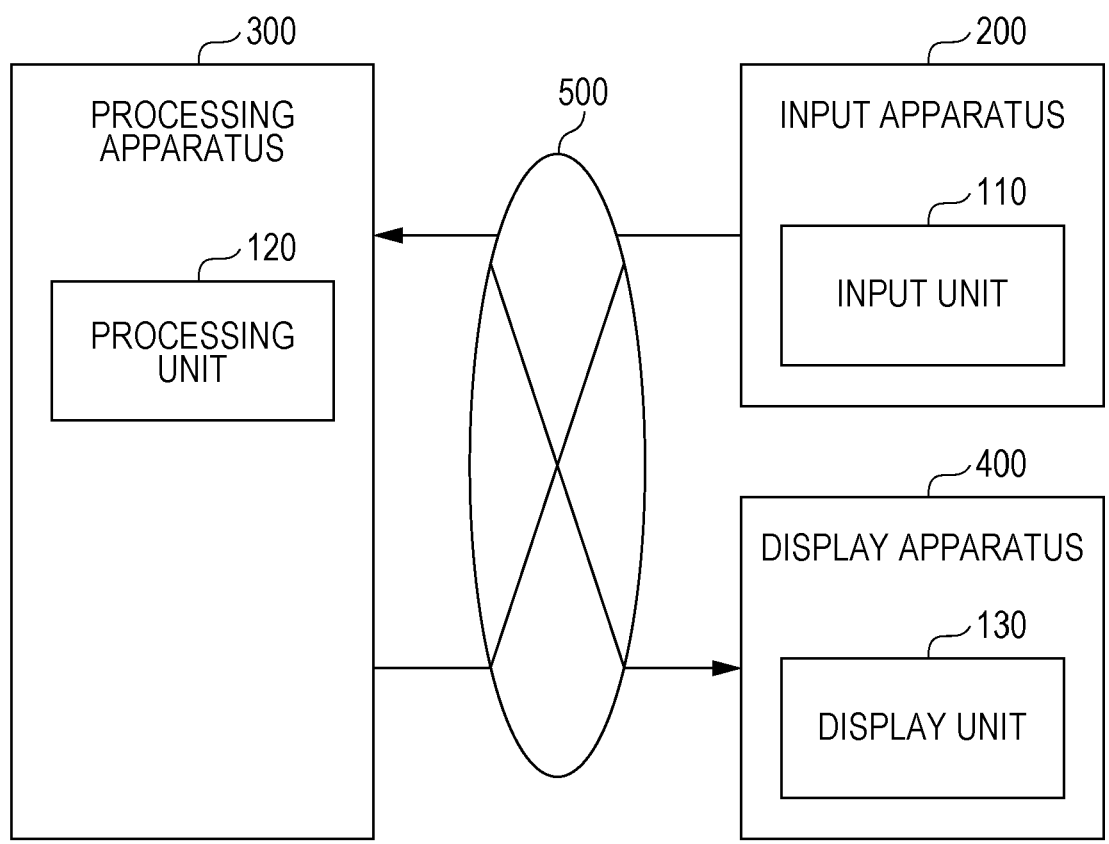
FIG. 2 is a diagram illustrating a configuration of an entire system for carrying out an evaluation result display method according to a variation of the first embodiment of the present disclosure.

FIG. 2 is a diagram illustrating a configuration of an entire system for carrying out an evaluation result display method according to a variation of the first embodiment of the present disclosure. The system illustrated in FIG. 2 is an example in which the input unit 110, the processing unit 120, and the display unit 130 are independent of one another as separate apparatuses.

A processing apparatus 300 is connected to an input apparatus 200 and a display apparatus 400 via a network 500. The processing apparatus 300 receives information input by the input unit 110 in the input apparatus 200 via the network 500. The processing apparatus 300 processes the received information to generate an evaluation result for a prediction. The processing apparatus 300 transmits the evaluation result to the display unit 130 in the display apparatus 400 via the network 500. The display unit 130 in the display apparatus 400 displays the evaluation result.

The input apparatus 200 is, for example, an apparatus that is configured with a personal computer, a smart phone, a feature phone, a tablet-type computer, or the like, equipped with an input function, and connectable to the network 500.

The processing apparatus 300 is, for example, an information processing apparatus that is configured with a server, a personal computer, a smart phone, a feature phone, a tablet-type computer, or the like and equipped with a calculation function.

The display apparatus 400 is, for example, a device that is configured with a display, a smart phone, a feature phone, a tablet-type computer, or the like, equipped with a display function, and connectable to the network 500.

The network 500 is a wired network such as Ethernet®, a wireless network such as a wireless local area network (LAN), a public network, a network configured as a combination of these networks, or the like. A public network is a communication line that is provided by telecommunication carriers for communication among an unspecified number of users and includes, for example, a general telephone line or integrated services digital network (ISDN).

Although a case in which the input apparatus 200, the processing apparatus 300, and the display apparatus 400 are configured as separate apparatuses was described above, the present disclosure is not limited to this configuration but a configuration in which one of the input apparatus 200, the processing apparatus 300, and the display apparatus 400 is separated from the other two, that is, the input apparatus 200, the processing apparatus 300, and the display apparatus 400 are configured as two apparatuses may be employed. Although a case in which individual apparatuses are connected via the network 500 was described in FIG. 2, the apparatuses may have wired connection using a high-definition multimedia interface (HDMI)® cable, a universal serial bus (USB) cable, or the like.

The following description of the first embodiment will be made by using the case in FIG. 1, assuming that the system for carrying out the evaluation result display method is configured as an apparatus. In the first embodiment, an evaluation result display method to evaluate a prediction model which predicts whether or not a user browses an advertisement will be described as an example.

1.2 Hardware Configuration

Figure 3:
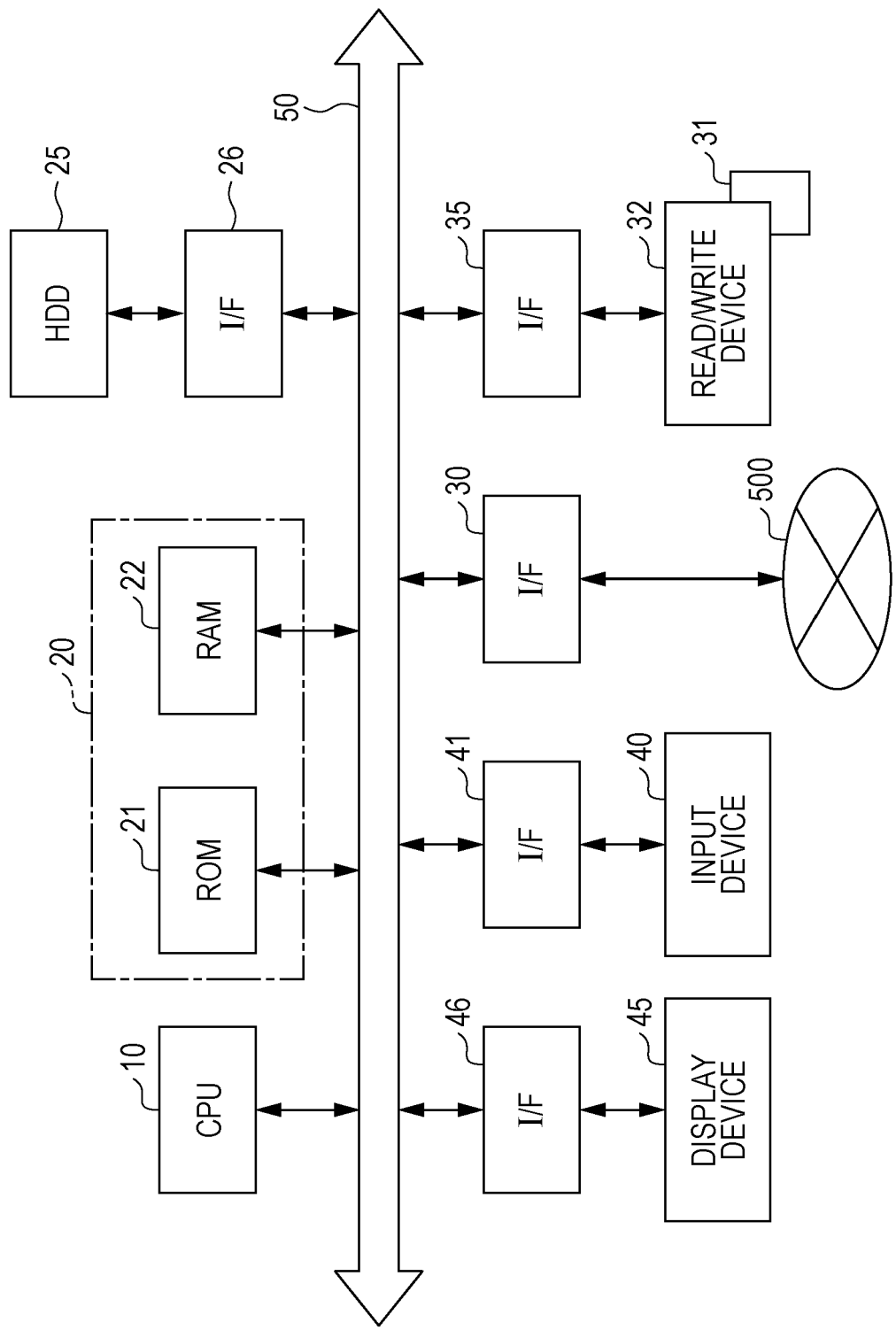
FIG. 3 is a diagram illustrating an example of a hardware configuration of an information processing apparatus for carrying out the evaluation result display method according to the first embodiment of the present disclosure.

FIG. 3 is a diagram illustrating an example of a hardware configuration of the information processing apparatus for carrying out the evaluation result display method according to the first embodiment of the present disclosure.

The information processing apparatus includes a central processing unit (CPU) 10, a memory device 20, a hard disk 25, a read/write device 32, an input device 40, and a display device 45. These devices are interconnected via a bus line 50. The hard disk 25, the read/write device 32, the input device 40, and the display device 45 are individually connected to the bus line 50 via interfaces (I/F) 26, 35, 41, and 46. The information processing apparatus is connected to the network 500 via an interface 30.

The CPU 10 may be configured with either a single CPU or a plurality of CPUs. FIG. 2 illustrates a case in which the information processing apparatus includes a single CPU 10.

The memory device 20 includes a read only memory (ROM) 21 and a random access memory (RAM) 22. The ROM 21 stores a computer program and data which define operations of the CPU 10. The computer program and data may also be stored in the hard disk 25. The CPU 10 carries out processing defined by the computer program, writing the computer program and data stored in the ROM 21 or the hard disk 25 into the RAM 22 as needed. The RAM 22 also functions as a medium which temporarily stores data generated in relation to the CPU 10 carrying out processing. The memory device 20 includes a non-volatile memory, such as a flash memory, which is writable and can hold stored data even after the power is cut off.

The hard disk 25 records and holds the computer program and input data of evaluation objects. This input data of evaluation objects are data collected to carry out a prediction on purchasing, browsing of an advertisement, or the like by each customer and include, for example, information such as access records to websites, purchase histories of customers, ages of customers, and sexes of customers. This input data of evaluation objects may be recorded in the RAM 22 (non-volatile memory).

The read/write device 32 read data from a portable recording medium 31 (for example, an SD memory card, a CD, a BD, or a memory card) and write data into the portable recording medium 31. Collected input data may be obtained through the portable recording medium 31.

The input device 40 is configured with, for example, a touch panel, an input button, an operation key, a keyboard, or a mouse, receives input from a user, and outputs the received input as an operation input signal. The input device 40 may be connected wirelessly and may not be directly connected to the bus line 50 in this case. The input device 40 may be configured with a sensor device and receive input through contactless manipulation (gesture, sound, or the like) from a user. The input device 40 corresponds to the input unit 110 in FIG. 1.

The display device 45 displays display data to be communicated to a user. The display device 45 is configured with, for example, a liquid crystal display (LCD). The display device 45 corresponds to the display unit 130 in FIG. 1.

As described thus far, the information processing apparatus is configured with a computer. It is possible to provide the above-described computer program not only by the ROM 21, the hard disk 25, a not-illustrated flexible disk, or the portable recording medium 31 but also through a transmission medium such as the network 500. For example, the computer program recorded in the portable recording medium 31 may be read out by the read/write device 32 being connected to the information processing apparatus. The information processing apparatus may store the read-out computer program into the RAM 22 or the hard disk 25.

When the computer program is provided by the ROM 21, which is used as a program recording medium, mounting the ROM 21 on the information processing apparatus makes it possible for the CPU 10 to carry out processing defined in the above-described computer program. The computer program provided through a transmission medium such as the network 500 is received via the interface 30 and stored in, for example, the RAM 22 or the hard disk 25. The transmission medium is not limited to a wired transmission medium and may be a wireless transmission medium.

Although the information processing apparatus in FIG. 3 includes the input device 40 and the display device 45, the information processing apparatus may have a configuration in which the information processing apparatus includes only a communication port and does not include the input device 40 or the display device 45. In such a case, the input device 40 or the display device 45 is externally attached to the information processing apparatus. For example, the input device 40 corresponds to the input apparatus 200 in FIG. 2. The display device 45 corresponds to the display apparatus 400 in FIG. 2. On the evaluation result display apparatus, a program running on the CPU 10 by use of the memory device 20 processes a prediction and an actual result, generates an evaluation result for a prediction model, and outputs the evaluation result to the display device 45.

1.3 Input Data

FIG. 4 is a diagram illustrating an example of input data according to the first embodiment of the present disclosure. The input data are source data from which an evaluation result for a prediction model is displayed. This prediction model predicts whether or not a user browses an advertisement.

A line in the input data is a piece of data (record) which indicates information on a user. Each record includes an age, sex, presence or absence of browsing of a target advertisement (actual result), and a browsing probability predicted by a prediction model (prediction probability) of each user. The input data is a collection of a plurality of records. The example in FIG. 4 illustrates data which indicate a prediction result (prediction of presence or absence of browsing of the target advertisement) for a plurality of users, and associate a result of prediction of which group, a group of users who "browse" the advertisement or a group of users who do "not browse" the advertisement, the user belongs to, an actual result of browsing, and attributes of each user (age, sex, and the like) with one another.

The prediction model outputs a prediction result, predicted by using, for example, a logistic regression analysis, a linear regression analysis, a neural network, a support vector machine, or a decision tree, for input data. For example, the prediction model calculates a browsing probability of the target advertisement based on the age or the sex of the user and outputs the browsing probability as a prediction result.

In general, for an evaluation of performance of a prediction model, an item used as an evaluation index and an actual result are used.

The item used as an evaluation index may be chosen from various items included in the input data such as an age or sex or may be a value calculated from a plurality of pieces of data included in the input data. The value calculated from a plurality of pieces of data is, for example, a value calculated from various items such as an age or sex by using various analysis methods such as a logistic regression analysis, a linear regression analysis, a neural network, a support vector machine, and a decision tree. The following description will be made on the assumption that a browsing probability predicted by a prediction model (prediction probability), which is the value calculated from a plurality of pieces of data, is chosen as the item used as an evaluation index.

The actual result is a value that indicates presence or absence of browsing of an advertisement. When the user actually browsed the target advertisement, the actual result is expressed by "1", and when the user actually did not browse the target advertisement, the actual result is expressed by "0". Each record includes a value which indicates which group, a group of users who actually browsed the target advertisement or a group of users who did not browse the target advertisement, the user belongs to. Each record includes a value which indicates a group to which each user actually belongs.

The items, values, and formats of the input data illustrated in FIG. 4 are only an example and are not limited to the example. Hereinafter, description of the input data will be made by use of the values illustrated in FIG. 4.

In the first embodiment, the prediction model predicts whether or not a user browses an advertisement. The evaluation result display apparatus can be used for not only a browsing prediction on an advertisement but also an evaluation of a prediction model in various fields such as a prediction model to predict whether or not a customer purchases a target commercial product and a prediction model to predict whether or not a user develops a disease.

The prediction model in this description predicts which group, a group of users who actually browsed a target advertisement or a group of users who actually did not browse the target advertisement, a user belongs to. However, the evaluation result display apparatus may evaluate a prediction model which predicts which group, not only between two groups but also among three or more groups, each of a plurality of objects belongs to.

1.4 Configuration of Apparatus Carrying Out Evaluation Result Display Method

Figure 5:
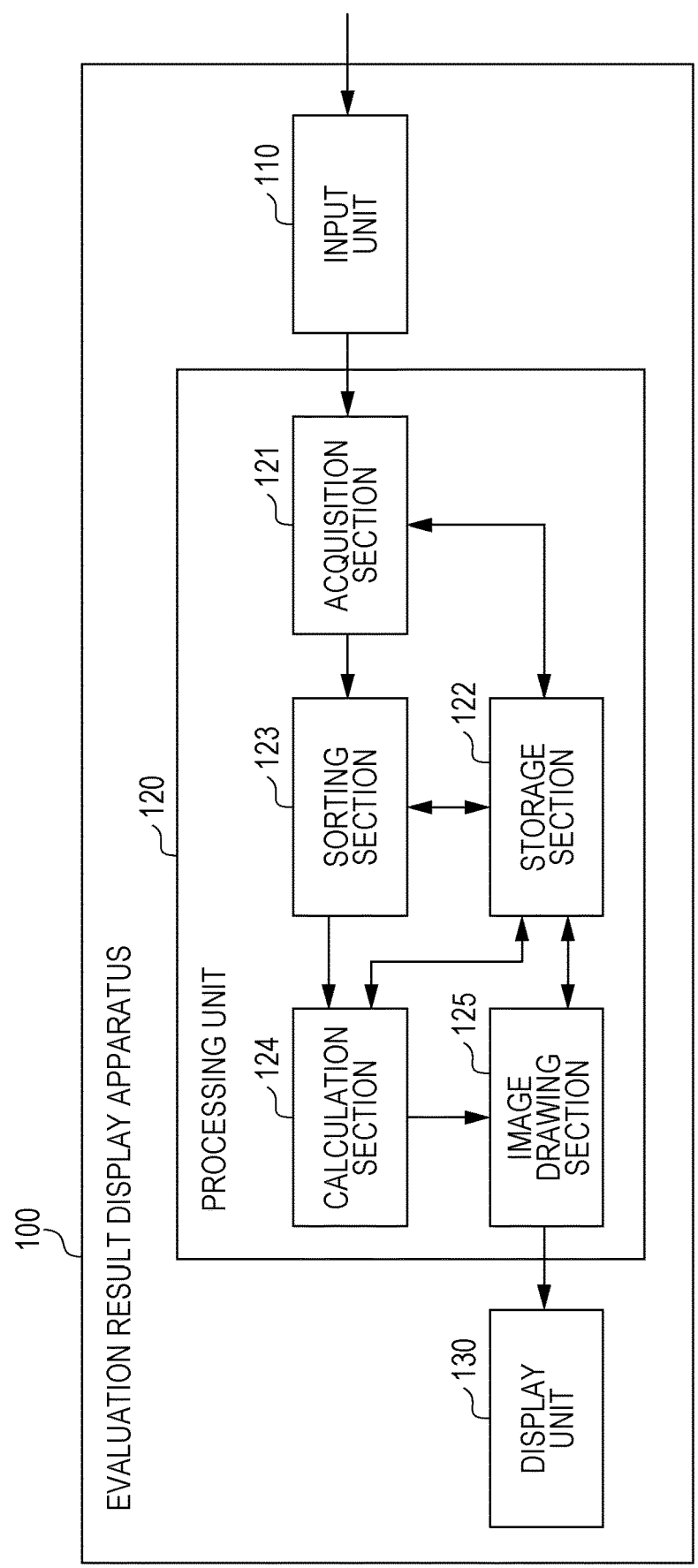
FIG. 5 is a block diagram illustrating a functional configuration of the system for carrying out the evaluation result display method according to the first embodiment of the present disclosure.

FIG. 5 is a block diagram illustrating a functional configuration of the system for carrying out the evaluation result display method according to the first embodiment of the present disclosure. In FIG. 5, a case in which the system for carrying out the evaluation result display method is configured in an apparatus is illustrated.

The evaluation result display apparatus 100 includes the input unit 110, the processing unit 120, and the display unit 130.

The processing unit 120 includes an acquisition section 121, a storage section 122, a sorting section 123, a calculation section 124, and an image drawing section 125.

The input unit 110 receives an input operation from a user and communicates an operation instruction to the acquisition section 121. The input unit 110 transmits input data, which are source data to display an evaluation result, to the acquisition section 121. The source input data are, for example, the input data illustrated in FIG. 4. The input unit 110 corresponds to, for example, the input device 40 illustrated in FIG. 3. A configuration in which the read/write device 32 reads the source input data via the portable recording medium 31 illustrated in FIG. 3 may also be employed.

The storage section 122 is, for example, a non-volatile memory or a volatile memory and includes an area into which data can be stored. The storage section 122 corresponds to, for example, the memory device 20 or the hard disk 25 illustrated in FIG. 3.

The acquisition section 121 receives the input data transmitted from the input unit 110 and stores the received input data in the storage section 122. The acquisition section 121 receives the operation instruction communicated from the input unit 110 and instructs the sorting section 123 to start processing. The acquisition section 121 acquires a plurality of records, which is a collection of records each of which includes a prediction value, which is predicted by the prediction model, and group information indicating a group each of the plurality of objects actually belongs to. The storage section 122 stores the plurality of records acquired by the acquisition section 121.

The sorting section 123 receives the instruction from the acquisition section 121 and starts processing. The sorting section 123 reads out the input data (a collection of a plurality of records) stored in the storage section 122. The sorting section 123 sorts the read-out plurality of records in ascending or descending order of the item used as an evaluation index, which is a value of the browsing probability predicted by a prediction model (prediction probability) in the first embodiment, and stores the sorted plurality of records in the storage section 122. The ascending order is a sequence the elements of which are ordered from an element with the smallest value to an element with the largest value, and the descending order is a sequence the elements of which are ordered from an element with the largest value to an element with the smallest value. Hereinafter, the description will be made on the assumption that the plurality of records are sorted in descending order (sorted sequentially from an item with the largest value to an item with the smallest value).

The sorting section 123 reads out the plurality of records stored in the storage section 122 and sorts the read-out plurality of records based on the prediction values. In the first embodiment, the prediction value includes a prediction probability which indicates a probability of the record belonging to a group classified as a correct decision among a plurality of groups. The sorting section 123 sorts the plurality of records in descending order of the prediction probability or in ascending order of the prediction probability.

The item used as an evaluation index may be determined based on a specification by the user through the input unit 110. In this case, the sorting section 123 receives the item used as an evaluation index, which is specified by the user and received by the input unit 110, via the acquisition section 121. The user selects a specific item included in the input data. The user also inputs a formula to calculate the item used as an evaluation index based on a plurality of pieces of data included in the input data.

Generating the input data in accordance with a predefined rule makes it possible for the sorting section 123 to specify a specific item included in the input data as the item used as an evaluation index. The predefined rule is, for example, a rule in which the specific item is specified by an order thereof in a record, such as an item at the top of the record, an item at the end of the record, and so on. The predefined rule is, for example, a rule in which the specific item is specified by using an index flag included in the input data. The sorting section 123 may determine the item used as an evaluation index from the input data generated in accordance with the predefined rule.

The calculation section 124 calculates the number of selected records and the number of records with an actual result of "1" (browsed the advertisement) among the actually selected records, and stores the calculated number of selected records and the calculated number of records with an actual result of "1" in association with each other in the storage section 122. The calculation section 124 sequentially selects records in sorted order from the plurality of records sorted by the sorting section 123, calculates the number of selections which indicates the number of selected records and the number of correct decisions which indicates the number of decisions in which the group information included in the selected record is decided to belong to a group classified as a correct decision among the plurality of groups, and outputs the number of selections and the number of correct decisions in association with each other.

Specifically, the calculation section 124 repeats the following procedure to the data (a collection of a plurality of records) sorted by the sorting section 123. First, the calculation section 124 selects a record at a time in order from the head record in the sorted data (the collection of the plurality of records) from the storage section 122. Next, the calculation section 124 updates the total number of records that have been selected thus far (a total of the numbers of selected records; hereinafter referred to as the total number of selections) by adding 1. Next, the calculation section 124 decides whether or not the actual result of the selected record, that is, presence or absence of browsing of the advertisement in the first embodiment, is "1" (browsed the advertisement). When the actual result included in the selected record is "1", the calculation section 124 updates the total number of records that have "1" in the item of presence or absence of browsing of the advertisement (a total of the numbers of records that have "1" in the item of actual result; hereinafter referred to as the number of correct decisions) among the records which have been selected thus far by adding 1. The calculation section 124 associates the total number of selections with the number of correct decisions and stores the total number of selections and the number of correct decisions in the storage section 122. The calculation section 124 repeats the processing described above for all records in order from the head record among the plurality of records sorted in descending order.

The method of selection and storage of records is not limited to the above-described method. For example, the calculation section 124 may select ten records at a time at equal intervals, calculate the total number of selections and the number of correct decisions, associate the calculated value of the total number of selections with the calculated value of the number of correct decisions, and store the values in the storage section 122. In other words, the calculation section 124 may select a predetermined number of records at a time and calculate the number of selections for the selected predetermined number of records and the number of correct decisions for the selected predetermined number of records.

The calculation section 124 may select a plurality of records that have the same browsing probabilities predicted by a prediction model at the same time, calculate the total number of selections and the number of correct decisions, associate the calculated value of the total number of selections with the calculated value of the number of correct decisions, and store the values in the storage section 122. In other words, the calculation section 124 may select all records that have the same prediction values in sorted order from among the plurality of records sorted by the sorting section 123 and calculate the number of selections for the selected records that have the same prediction values and the number of correct decisions for the selected records that have the same prediction values.

The image drawing section 125 reads out combinations of the total number of selections and the number of correct decisions stored in the storage section 122 and generates a graph with the vertical axis (y-axis) representing the number of correct decisions and the horizontal axis (x-axis) representing the total number of selections. The image drawing section 125 generates a graph which is created by plotting the number of selections and the number of correct decisions output by the calculation section 124 in a coordinate system with the horizontal axis representing the number of selections and the vertical axis representing the number of correct decisions. The image drawing section 125 transmits drawing data of the generated graph to the display unit 130. The graph may be drawn in a form of point graph which is created by plotting points with coordinate values (the total number of selections as an x-axis value and the number of correct decisions as a y-axis value). The graph may also be drawn in a form of line graph which is created by plotting lines that interpolate points with adjacent coordinate values (the total number of selections as an x-axis value and the number of correct decisions as a y-axis value), by linking the points.

Furthermore, the image drawing section 125 may draw a line which links the origin (0, 0), which is a point at which the number of correct decisions takes 0 and the total number of selections takes 0, with a point at which the number of correct decisions takes the maximum value and the total number of selections takes the maximum value, that is, a point expressing a value when all data are selected, of the graph by superimposing the line in the coordinate system. This line indicates a relation between the total number of selections and the number of correct decisions when data are selected at random.

The display unit 130 receives and displays the drawing data of the graph generated by the image drawing section 125. The display unit 130 displays the graph generated by the image drawing section 125.

Figure 6:
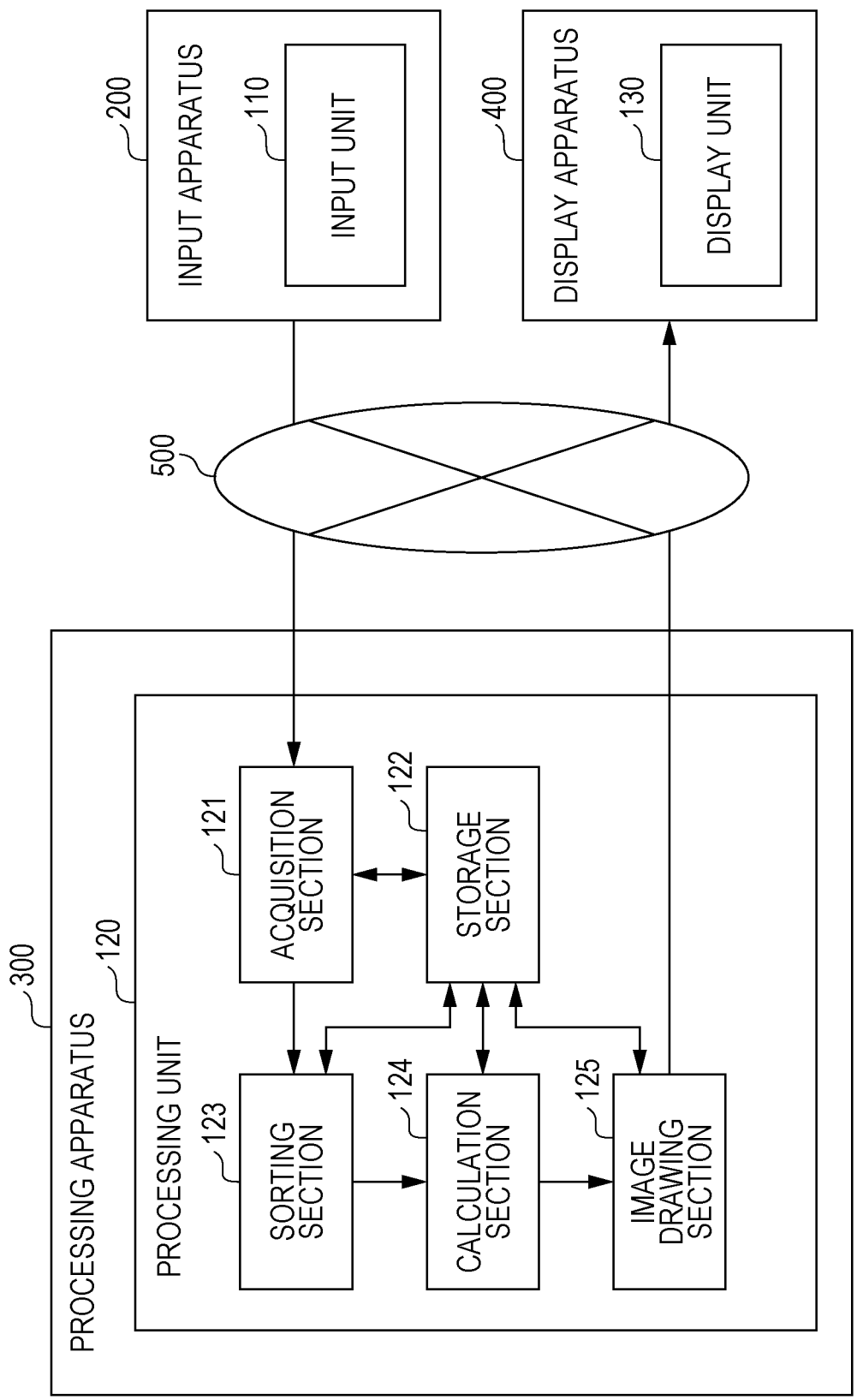
FIG. 6 is a block diagram illustrating a functional configuration of the system for carrying out the evaluation result display method according to the variation of the first embodiment of the present disclosure.

FIG. 6 is a block diagram illustrating a functional configuration of a system for carrying out an evaluation result display method according to a variation of the first embodiment of the present disclosure. FIG. 6 illustrates an example of a case in which the system for carrying out the evaluation result display method is configured with a plurality of apparatuses. Because each component in FIG. 6 has a corresponding component described in FIG. 5, description of the components will be omitted.

1.5 Display Result Output by Evaluation Result Display Method

Figure 7:
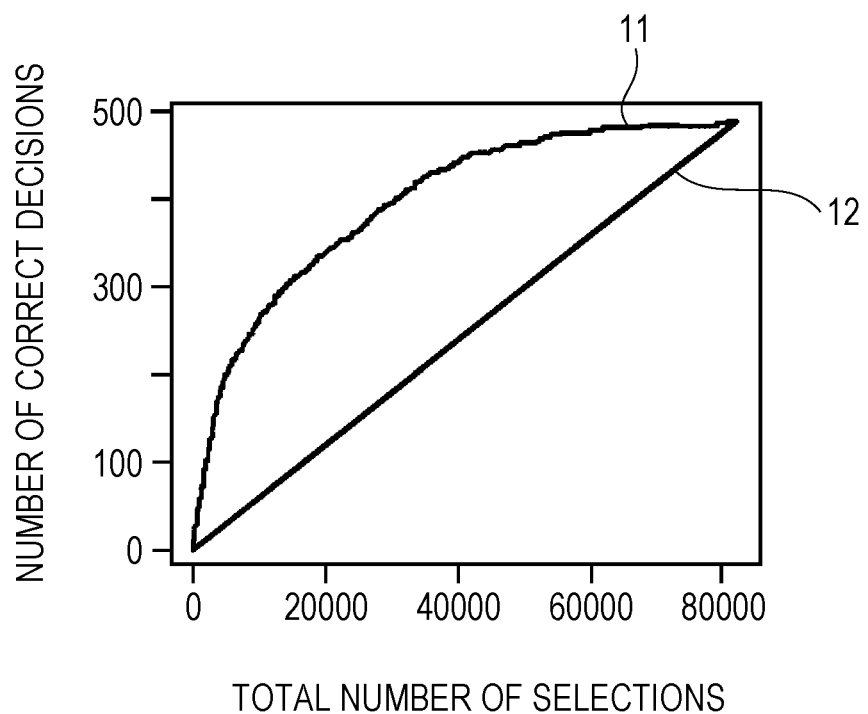
FIG. 7 is a diagram illustrating an example of a display result that is output by the evaluation result display method according to the first embodiment of the present disclosure.

FIG. 7 is a diagram illustrating an example of a display result output by the evaluation result display method according to the first embodiment of the present disclosure.

FIG. 7 is a diagram illustrating an example of a graph drawn by the evaluation result display method according to the first embodiment of the present disclosure. The display unit 130 displays a graph 11 illustrated in FIG. 7. The graph 11 is a graph which is created by plotting the number of correct decisions and the total number of selections calculated by the calculation section 124 in a coordinate system with the vertical axis (y-axis) representing the number of correct decisions and the horizontal axis (x-axis) representing the total number of selections. The display unit 130 adjusts the graph so that the vertical axis and the horizontal axis have a ratio of 1:1. The display unit 130 also displays a line 12 which links the origin (0, 0) with a point at which the total number of selections takes a maximum value and the number of correct decisions takes a maximum value. The line 12 is a line that indicates the total number of selections and the number of correct decisions when the input data are selected at random. The graphs illustrate that the higher the graph 11 indicating a relation between the number of correct decisions and the total number of selections, both calculated by the calculation section 124, is positioned than the line 12, which is positioned in the center, indicating the total number of selections and the number of correct decisions when the input data are selected at random, the better the prediction model is.

The display unit 130 may not display the line 12 which links the origin with the point at which the total number of selections takes a maximum value and the number of correct decisions takes a maximum value.

1.6 Evaluation Result Display Method

Next, referring to FIG. 8, the evaluation result display method will be described.

Figure 8:
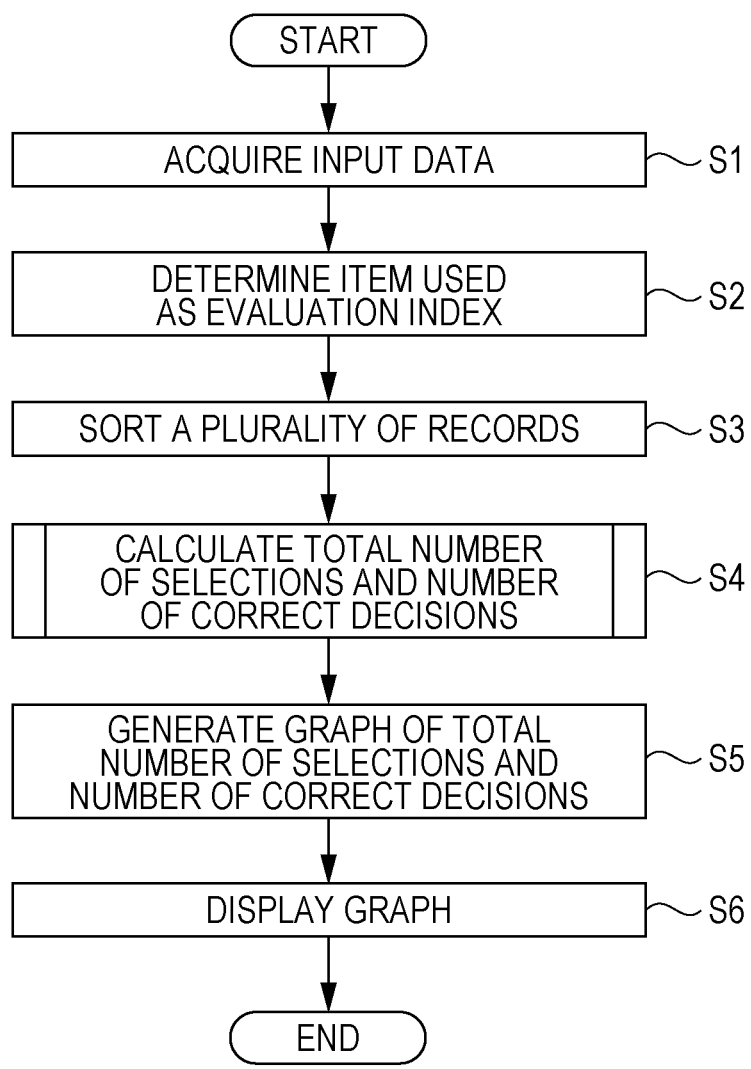
FIG. 8 is a flowchart illustrating a processing flow of the evaluation result display method according to the first embodiment of the present disclosure.

FIG. 8 is a flowchart illustrating a processing flow of the evaluation result display method according to the first embodiment of the present disclosure.

First, the acquisition section 121 acquires input data which are source data to display an evaluation result (step S1). The input unit 110 receives the input data which are source data to display an evaluation result and transmits the received input data to the acquisition section 121. The acquisition section 121 receives the input data transmitted by the input unit 110 and stores the received input data in the storage section 122.

Next, the sorting section 123 determines an item which is used as an evaluation index (step S2). In the determination, the input unit 110 receives an operation from the user and communicates the received operation instruction to the acquisition section 121. The acquisition section 121 receives the operation instruction communicated by the input unit 110 and communicates a start of processing to the sorting section 123.

Next, the sorting section 123 reads out the input data (a collection of a plurality of records) stored in the storage section 122 and sorts the read-out plurality of records based on the item used as an evaluation index (step S3). In this processing, the item used as an evaluation index is a browsing probability (prediction probability) value predicted by the prediction model. The sorting section 123 sorts the plurality of records in descending order of the browsing probability. The sorting section 123 stores the sorted plurality of records in the storage section 122.

Next, with respect to the collection of the plurality of records sorted by the sorting section 123, the calculation section 124 reads out records in order from the head record and calculates the total number of selections and the number of correct decisions (step S4). The calculation section 124 stores the calculated total number of selections and the calculated number of correct decisions in association with each other in the storage section 122. The processing to calculate the total number of selections and the number of correct decisions in step S4 will be described later in detail with reference to drawings.

Next, the image drawing section 125 reads out combinations of the total number of selections and the number of correct decisions, both stored in the storage section 122, and generates a graph which is created by plotting the read-out total number of selections and the read-out number of correct decisions in a coordinate system with the vertical axis (y-axis) representing the number of correct decisions and the horizontal axis (x-axis) representing the total number of selections (step S5). The image drawing section 125 transmits drawing data of the generated graph to the display unit 130.

Last, the display unit 130 receives and displays the drawing data of the graph generated by the image drawing section 125 (step S6).

1.7 Calculation Method of Total Number of Selections and Number of Correct Decisions Next, referring to drawings, the processing to calculate the total number of selections and the number of correct decisions will be described. The following description of the processing is a detailed description of the processing in step S4 in FIG. 8.

Figure 9:
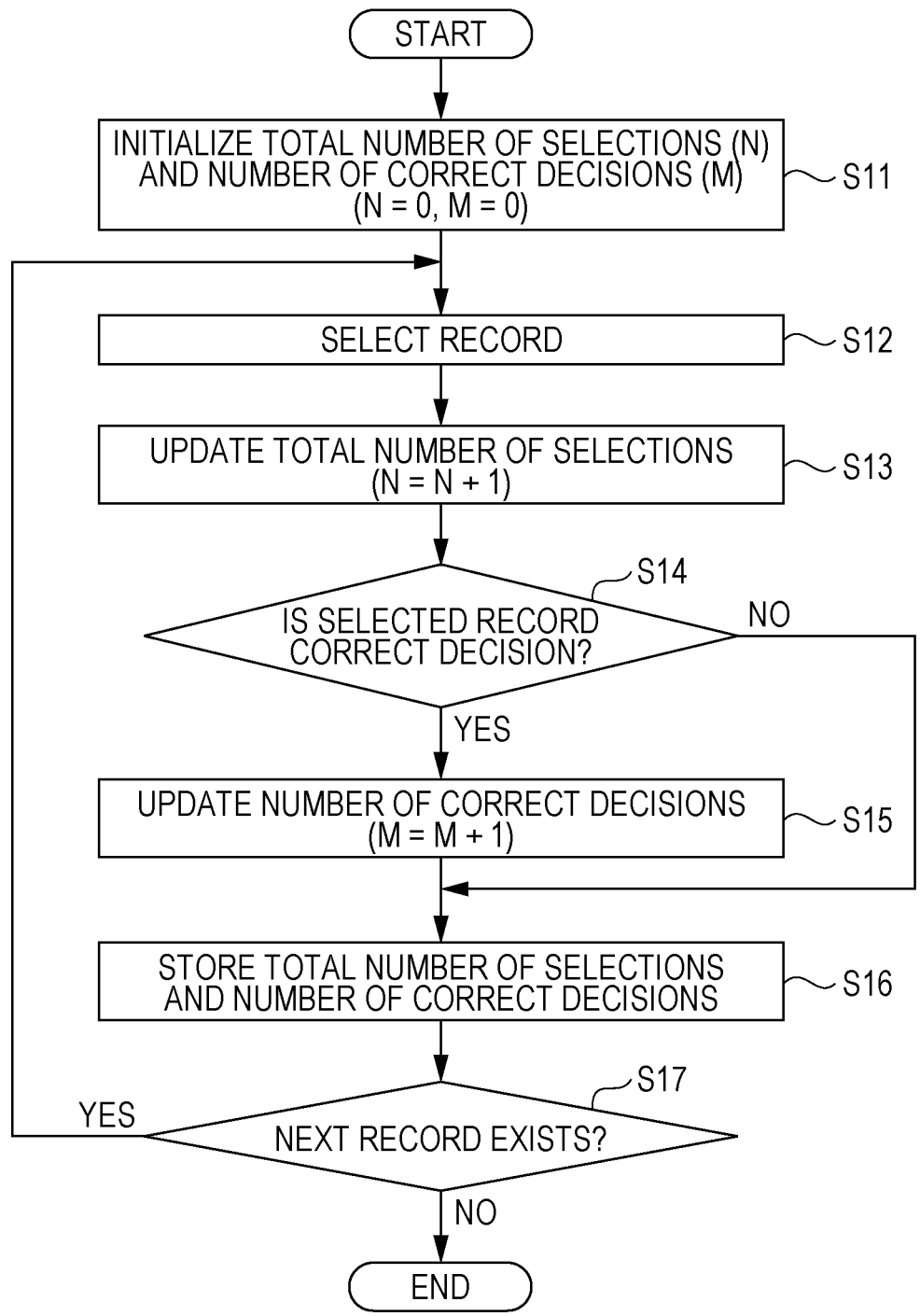
FIG. 9 is a flowchart illustrating an example of processing of calculating the total number of selections and the number of correct decisions in a calculation section according to the first embodiment of the present disclosure.

FIG. 9 is a flowchart illustrating an example of the processing of calculating the total number of selections and the number of correct decisions in the calculation section 124. After the sorting section 123 finishes sorting the plurality of records, the calculation section 124 receives a communication from the sorting section 123 and starts the calculation processing.

First, the calculation section 124 initializes the total number of selections (N) and the number of correct decisions (M) (step S11). Specifically, the calculation section 124 sets an initial value (=0) to the total number of selections (N) and also sets an initial value (=0) to the number of correct decisions (M). The total number of selections indicates the total number of records that have been selected thus far. The number of correct decisions indicates the total number of records that have been decided thus far to belong to a group predefined to be a correct decision among a plurality of groups.

Next, the calculation section 124 selects the head record from among the sorted data (a collection of a plurality of records) from the storage section 122 (step S12). In the first round, the calculation section 124 selects the headmost record. After the second round, the calculation section 124 selects a next record that has not been selected yet.

Next, the calculation section 124 updates the total number of selections (step S13). Specifically, the calculation section 124 adds 1 to the total number of selections N (N=N+1).

Next, the calculation section 124 decides whether or not the actual result included in the selected record is the correct decision (step S14). In this decision, the calculation section 124 decides whether or not data on presence or absence of browsing of an advertisement is "1".

Although, in the first embodiment, a group of records that indicates the advertisement was browsed is regarded as a group having the correct decision, and a group of records that indicates the advertisement was not browsed is regarded as a group having the wrong decision, the present disclosure is not limited to this categorization, and the group of records that indicates the advertisement was not browsed may be regarded as a group having the correct decision and the group of records that indicates the advertisement was browsed may be regarded as a group having the wrong decision. In other words, all cases in which the actual results have a positive result are not always regarded as a correct decision, and even a case in which the actual result is a negative result may be regarded as a correct decision.

When the selected record is decided not to be the correct decision (NO in step S14), the process transitions to processing in step S16. On the other hand, the selected record is decided to be the correct decision (YES in step S14), the calculation section 124 updates the number of correct decisions (step S15). Specifically, the calculation section 124 adds 1 to the number of correct decisions M (M=M+1).

Next, the calculation section 124 associates the current value of the total number of selections with the current value of the number of correct decisions and stores the values in the storage section 122 (step S16).

Next, the calculation section 124 decides whether or not a next record that has not been selected yet exists among the data (a plurality of records) sorted in descending order of the browsing probability (step S17).

When it is decided that no next record exists (NO in step S17), the process ends. On the other hand, when it is decided that a next record exists (YES in step S17), the process transitions to the processing in step S12, and the calculation section 124 selects the next record. Then, the calculation section 124 repeats the processing in steps S12 to S17.

Next, another example of the processing of calculating the total number of selections and the number of correct decisions will be described.

Figure 10:
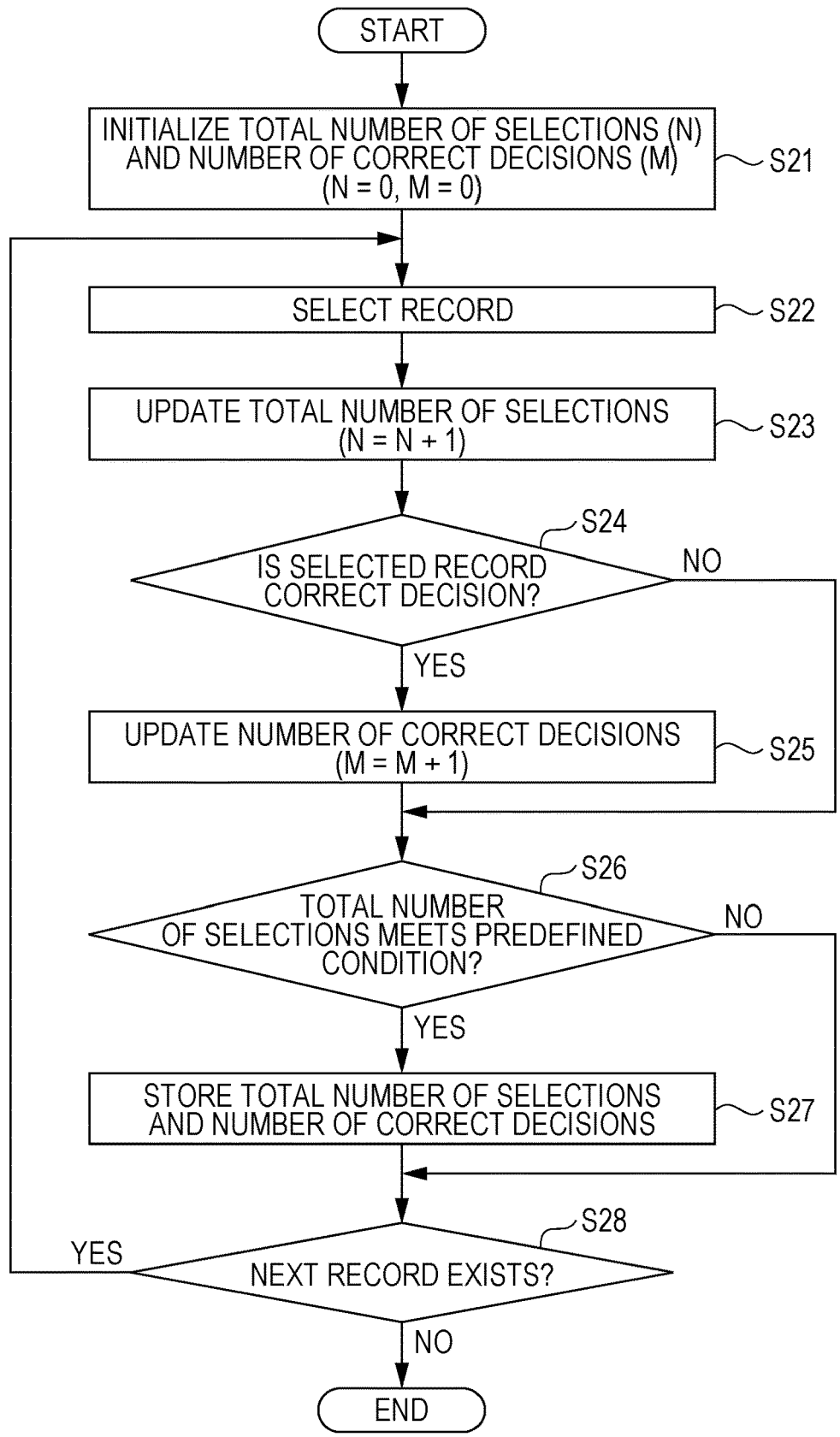
FIG. 10 is a flowchart illustrating an example of a first variation of processing of calculating the total number of selections and the number of correct decisions in the calculation section according to the first embodiment of the present disclosure.

FIG. 10 is a flowchart illustrating a first variation of the processing to calculate the total number of selections and the number of correct decisions in the calculation section 124. After the sorting section 123 finishes sorting the plurality of records, the calculation section 124 receives a communication from the sorting section 123 and starts the calculation processing.

First, the calculation section 124 initializes the total number of selections (N) and the number of correct decisions (M) (step S21). Specifically, the calculation section 124 sets an initial value (=0) to the total number of selections (N), and also sets an initial value (=0) to the number of correct decisions (M).

Next, the calculation section 124 selects the head record from among the sorted data (a collection of a plurality of records) from the storage section 122 (step S22). In the first round, the calculation section 124 selects the headmost record. After the second round, the calculation section 124 selects a next record that has not been selected yet.

Next, the calculation section 124 updates the total number of selections (step S23). Specifically, the calculation section 124 adds 1 to the total number of selections N (N=N+1).

Next, the calculation section 124 decides whether or not the actual result included in the selected record is the correct decision (step S24). In this decision, the calculation section 124 decides whether or not data on presence or absence of browsing of the advertisement is "1".

When the selected record is decided not to be the correct decision (NO in step S24), the process transitions to processing in step S26. On the other hand, the selected record is decided to be the correct decision (YES in step S24), the calculation section 124 updates the number of correct decisions (step S25). Specifically, the calculation section 124 adds 1 to the number of correct decisions M (M=M+1).

Next, the calculation section 124 decides whether or not the current value of the total number of selections meets a predefined condition (step S26). Based on the decision, the calculation section 124 determines whether or not to store the current values (of the total number of selections and the number of correct decisions) in the storage section 122. In the decision, the calculation section 124 decides whether or not the current value of the total number of selections is, for example, a multiple of 10. When the current value of the total number of selections is decided to be a multiple of 10, the calculation section 124 stores the current values (of the total number of selections and the number of correct decisions) in the storage section 122. When the current value of the total number of selections is decided not to be a multiple of 10, the calculation section 124 does not store the current values (of the total number of selections and the number of correct decisions) in the storage section 122.

When it is decided that the current value of the total number of selections does not meet the predefined condition (NO in step S26), the process transitions to processing in step S28. On the other hand, when it is decided that the current value of the total number of selections meets the predefined condition (YES in step S26), the calculation section 124 associates the current value of the total number of selections with the current value of the number of correct decisions and stores the values in the storage section 122 (step S27).

Next, the calculation section 124 decides whether or not a next record that has not been selected yet exists among the data (a plurality of records) sorted in descending order of the browsing probability (step S28).

When it is decided that no next record exists (NO in step S28), the process ends. On the other hand, when it is decided that a next record exists (YES in step S28), the process transitions to the processing in step S22, and the calculation section 124 selects the next record. Then, the calculation section 124 repeats the processing in steps S22 to S28.

Although, in step S26, the calculation section 124 decides whether or not the current value of the total number of selections is, for example, a multiple of 10, the present disclosure is not limited to this criterion, and the calculation section 124 may decides whether or not the current value of the total number of selections is a predetermined multiple.

Next, still another example of the processing of calculating the total number of selections and the number of correct decisions will be described.

Figure 11:
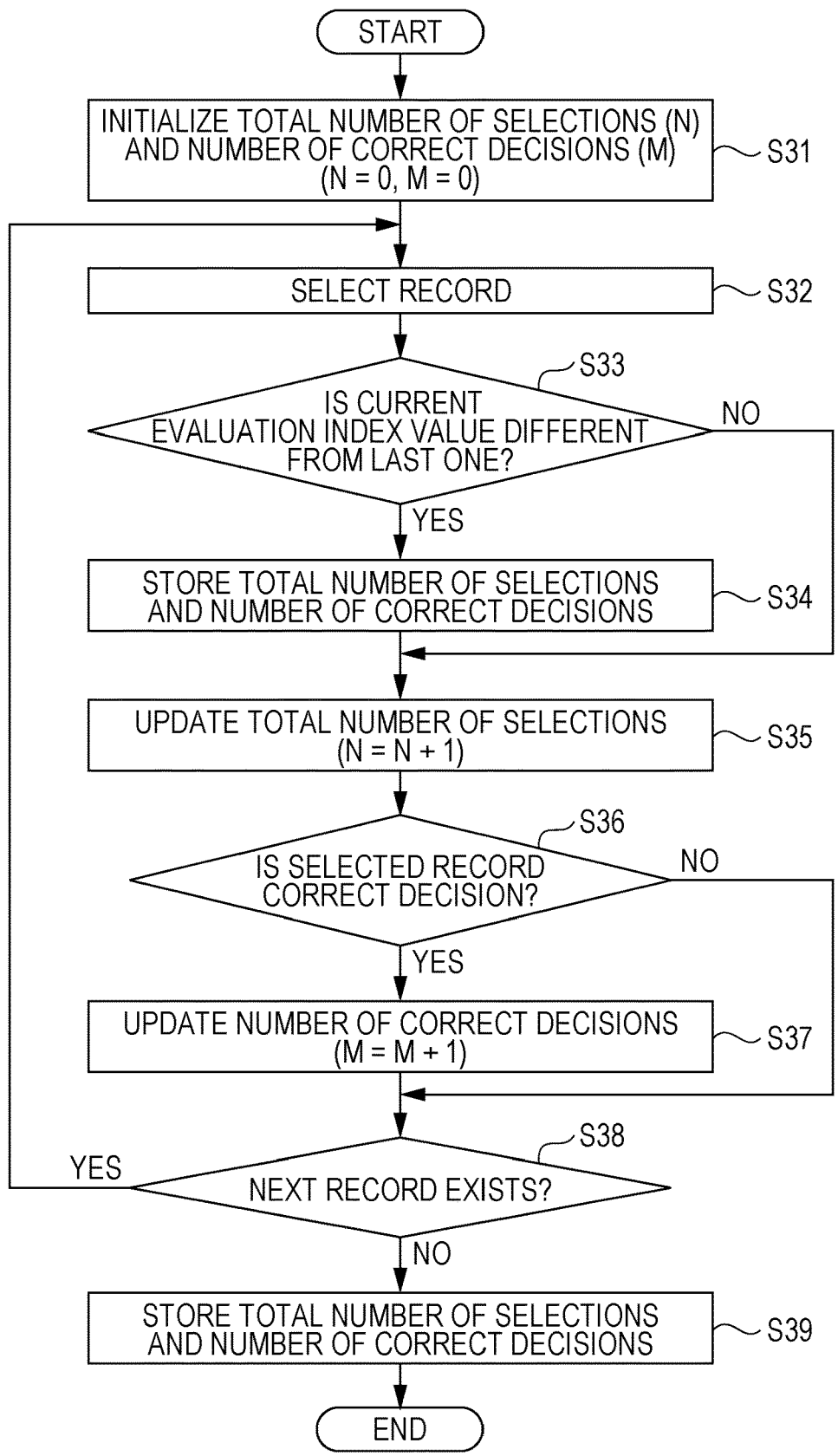
FIG. 11 is a flowchart illustrating an example of a second variation of processing of calculating the total number of selections and the number of correct decisions in the calculation section according to the first embodiment of the present disclosure.

FIG. 11 is a flowchart illustrating a second variation of the processing to calculate the total number of selections and the number of correct decisions in the calculation section 124. After the sorting section 123 finishes sorting the plurality of records, the calculation section 124 receives a communication from the sorting section 123 and starts the calculation processing.

First, the calculation section 124 initializes the total number of selections (N) and the number of correct decisions (M) (step S31). Specifically, the calculation section 124 sets an initial value (=0) to the total number of selections (N), and also sets an initial value (=0) to the number of correct decisions (M).

Next, the calculation section 124 selects the head record from among the sorted data (a collection of a plurality of records) from the storage section 122 (step S32). In the first round, the calculation section 124 selects the headmost record. After the second round, the calculation section 124 selects a next record that has not been selected yet.

Next, the calculation section 124 decides whether or not an evaluation index value included in the record selected in the current round differs from an evaluation index value included in the record selected in the last round (step S33). In the decision, the evaluation index value is a browsing probability predicted by the prediction model. In other words, the calculation section 124 decides whether or not a browsing probability included in the record selected in the current round differs from a browsing probability included in the record selected in the last round. Because a record selected in the last round does not exist in the first round, the calculation section 124 decides that the browsing probability included in the record selected in the current round does not differ from (is the same as) the browsing probability included in the record selected in the last round (NO in step S33).

When it is decided that the browsing probability included in the record selected in the current round does not differ from the browsing probability included in the record selected in the last round (NO in step S33), the process transitions to processing in step S35. On the other hand, when it is decided that the browsing probability included in the record selected in the current round differs from the browsing probability included in the record selected in the last round (YES in step S33), the calculation section 124 associates the current value of the total number of selections with the current value of the number of correct decisions and stores the values in the storage section 122 (step S34).

Next, the calculation section 124 updates the total number of selections (step S35). Specifically, the calculation section 124 adds 1 to the total number of selections N (N=N+1).

Next, the calculation section 124 decides whether or not the actual result included in the selected record is the correct decision (step S36). In this decision, the calculation section 124 decides whether or not data on presence or absence of browsing of the advertisement is "1".

When it is decided that the selected record is not the correct decision (NO in step S36), the process transitions to processing in step S38. On the other hand, when it is decided that the selected record is the correct decision (YES in step S36), the calculation section 124 updates the number of correct decisions (step S37). Specifically, the calculation section 124 adds 1 to the number of correct decisions M (M=M+1).

Next, the calculation section 124 decides whether or not a next record that has not been selected yet exists among the data (a plurality of data) sorted in descending order of the browsing probability (step S38).

When it is decided that no next record exists (NO in step S38), the calculation section 124 associates the current value of the total number of selections with the current value of the number of correct decisions and stores the values in the storage section 122 (step S39), and the process ends. On the other hand, when it is decided that a next record exists (YES in step S38), the process transitions to the processing in step S32, and the calculation section 124 selects the next record. Then, the calculation section 124 repeats the processing in steps S32 to S38.

1.8 Advantageous Effect

As described above, according to the first embodiment of the present disclosure, it is possible to appropriately exhibit an evaluation of a prediction result in a graph by calculating only the total number of selections and the number of correct decisions. With this method, it is possible to reduce an amount of memory usage required for a calculation of an evaluation result, compared with a conventional evaluation result display method in which all data are checked and both TP rates and the FP rates are calculated in order.

In other words, although, in a conventional evaluation result display method, it is necessary to store three parameters, namely the total number of selections, the number of correct decisions, and the number of wrong decisions, in the memory, in the evaluation result display method of the first embodiment, it is sufficient to store only two parameters, the total number of selections and the number of correct decisions, in the memory, and it is thus possible to reduce an amount of memory usage required for a calculation of an evaluation result.

Moreover, the evaluation result display method and the evaluation result display apparatus of the first embodiment of the present disclosure make it possible to not only reduce an amount of memory usage but also shorten processing time in an evaluation of a prediction result, in particular, for significantly biased data.

Second Embodiment

In the first embodiment, a method to display an evaluation result of a prediction model while reducing an amount of memory usage was described. In other words, in the evaluation result of a prediction model displayed in the first embodiment, it is shown that, the higher a graph expressing a relation between the calculated number of correct decisions and the calculated total number of selections is positioned than a line expressing the total number of selections and the number of correct decisions when input data are selected at random, the better the prediction model is. However, when a plurality of graphs exhibiting evaluation results of a plurality of prediction models are displayed, and the plurality of graphs are similar to one another, it is difficult to decide which prediction model is the best.

Accordingly, in the second embodiment, a method to calculate an index by which, among a plurality of prediction models, which prediction model is the best can be objectively evaluated will be described. Specifically, the index by which the best prediction model is objectively evaluated is an area on the lower side of a graph expressing a relation between the number of correct decisions and the total number of selections, and it is possible to decide that, the larger the area is, the better the prediction model is. In the evaluation result display method of the second embodiment, an area ratio of the area on the lower side of the graph expressing an evaluation result of a prediction model to the total area, which is calculated by multiplying a maximum value of the total number of selections by a maximum value of the number of correct decisions, is calculated, and the calculated value of the area ratio is displayed with the graph.

2.1 Configuration of Apparatus Carrying Out Evaluation Result Display Method

Figure 12:
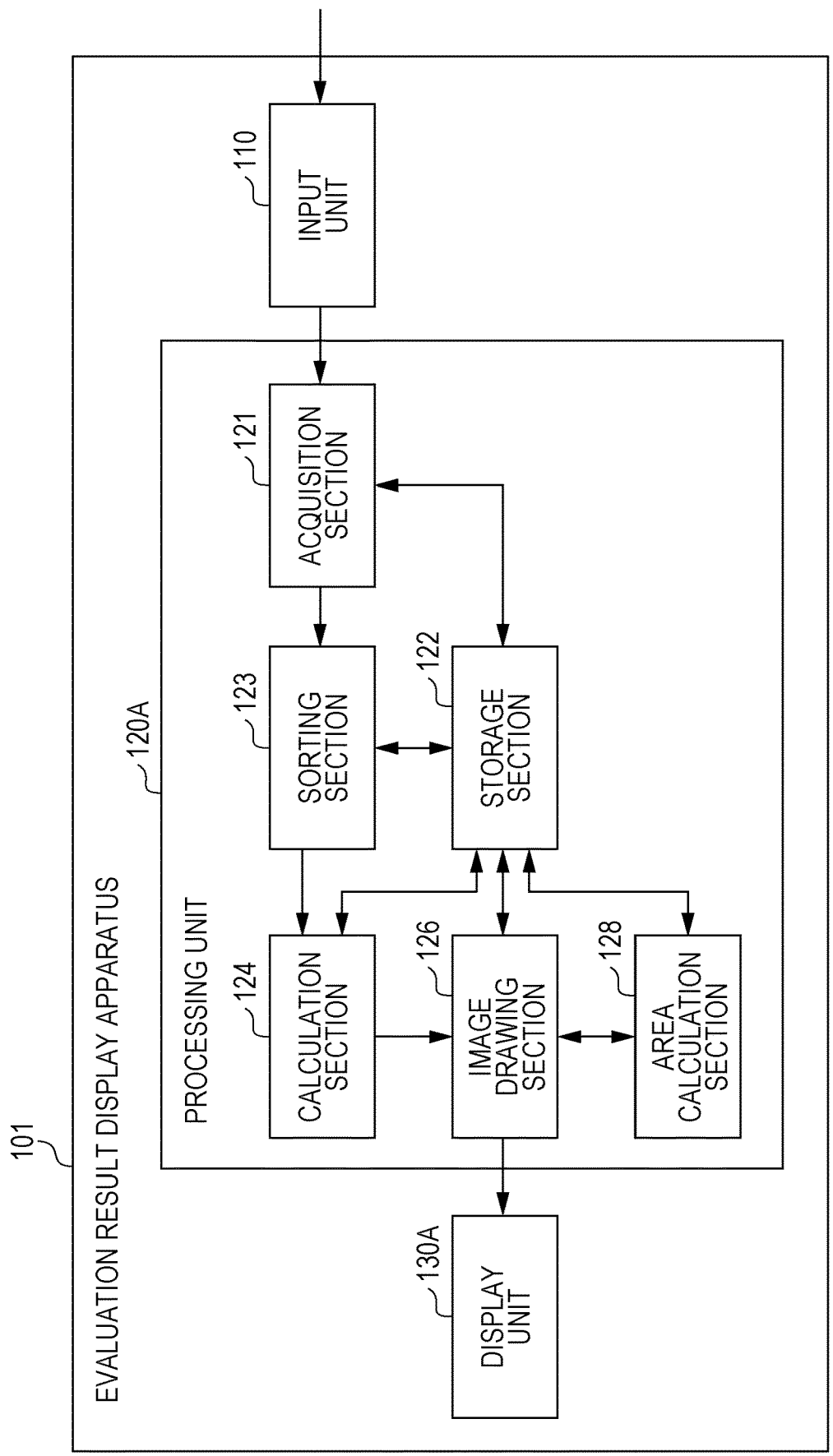
FIG. 12 is a block diagram illustrating a functional configuration of a system for carrying out an evaluation result display method according to a second embodiment of the present disclosure.

FIG. 12 is a block diagram illustrating a functional configuration of a system for carrying out the evaluation result display method according to the second embodiment of the present disclosure. FIG. 12 illustrates a case in which the system for carrying out the evaluation result display method is configured as an apparatus.

An evaluation result display apparatus 101 illustrated in FIG. 12 includes an input unit 110, a processing unit 120A, and a display unit 130A. The evaluation result display apparatus 101 illustrated in FIG. 12 differs from the configuration illustrated in FIG. 5 with respect to the processing unit 120A and the display unit 130A.

The processing unit 120A includes an acquisition section 121, a storage section 122, a sorting section 123, a calculation section 124, an image drawing section 126, and an area calculation section 128. The processing unit 120A includes, in addition to the configuration of the processing unit 120 in FIG. 5, the area calculation section 128, and the image drawing section 126 has a different function from the function of the image drawing section 125 in FIG. 5. The acquisition section 121, the storage section 122, the sorting section 123, and the calculation section 124 included in the processing unit 120A have similar functions to functions of the acquisition section 121, the storage section 122, the sorting section 123, and the calculation section 124 in FIG. 5 described above, respectively. In FIG. 12, components similar to corresponding components in FIG. 5 have identical reference characters, and description of such components will be omitted.

The image drawing section 126 reads out combinations of the total number of selections and the number of correct decisions, stored in the storage section 122, and generates a graph in a coordinate system with the vertical axis (y-axis) representing the number of correct decisions and the horizontal axis (x-axis) representing the total number of selections. The image drawing section 126 instructs the area calculation section 128 to start a calculation of an area ratio and receives the area ratio, which is a result of the calculation, from the area calculation section 128. The image drawing section 126 transmits drawing data of the generated graph and the area ratio value received from the area calculation section 128 to the display unit 130A. The graph is drawn in a form of line graph which is created by plotting lines which link points with adjacent coordinate values (the total number of selections as an x-axis value and the number of correct decisions as a y-axis value). The graph may also be drawn in a form of point graph which is created by plotting points with coordinate values (the total number of selections as an x-axis value and the number of correct decisions as a y-axis value). Furthermore, the image drawing section 126 may draw a line which links the origin (0, 0), which is a point at which the number of correct decisions takes 0 and the total number of selections takes 0, with a point at which the number of correct decisions takes the maximum value and the total number of selections takes the maximum value, that is, a point expressing a value when all data are selected, of the graph by superimposing the line in the coordinate system. This line expresses the total number of selections and the number of correct decisions when data are selected at random.

The area calculation section 128 calculates an area ratio of the area on the lower side of the graph generated by the image drawing section 126 to the total area calculated by multiplying the maximum value taken by the total number of selections by the maximum value taken by the number of correct decisions and outputs the calculated value of the area ratio.

The area calculation section 128 calculates the area ratio of the area on the lower side of the graph generated by the image drawing section 126 to the total area calculated by multiplying the maximum value taken by the total number of selections by the maximum value taken by the number of correct decisions. The area calculation section 128 receives the instruction to start the calculation from the image drawing section 126, calculates the area ratio, and returns the value of the area ratio, which is a calculation result, to the image drawing section 126. Specifically, the graph generated by the image drawing section 126 is expressed in a form of line graph which is created by plotting lines linking points with coordinate values (the total number of selections as an x-axis value and the number of correct decisions as a y-axis value) calculated by the calculation section 124 with each other.

The area calculation section 128 calculates an area S1 on the lower side of the graph based on the following formula (1). In the following formula (1), $x_i$ denotes the number of correct decisions, $f(x_i)$ denotes the total number of selections, and n denotes the number of points.

$$S1 = \sum_{i=1}^{n-1} \frac{(f(x_{i+1}) + f(x_i))(x_{i+1} - x_i)}{2} \qquad (1)$$

In other words, the area S1 on the lower side of the graph is calculated by summing all areas of trapezoids, each of which is formed by two points having adjacent coordinate values (the total number of selections as an x-axis value and the number of correct decisions as a y-axis value) exhibited in the line graph and two intersection points between the horizontal axis (x-axis) and two perpendicular lines each passing through each of the two points, that is, four points in total.

The area calculation section 128 also calculates the total area S2 based on the following formula (2).

$$S2 = x_n * f(x_n) \qquad (2)$$

In other words, the total area S2 is calculated by multiplying the maximum value of the number of correct decisions by the maximum value of the total number of selections. The maximum value of the number of correct decisions and the maximum value of the total number of selections are a value of the total number of selections and a value of the number of correct decisions that the calculation section 124 calculates by selecting the final record, respectively, and a combination of the total number of selections and the number of correct decisions that the calculation section 124 lastly stores in the storage section 122. The area calculation section 128 calculates the area S1 on the lower side of the graph and the total area S2 by use of combinations of the total number of selections and the number of correct decisions, which are stored in the storage section 122. Then, the area calculation section 128 calculates an area ratio R (calculated by dividing the area S1 on the lower side of the graph by the total area S2) based on the following formula (3) and outputs the calculated value of the area ratio R.

$$R = \frac{S1}{S2} = \frac{\sum_{i=1}^{n-1} \frac{(f(x_{i+1}) + f(x_i))(x_{i+1} - x_i)}{2}}{x_n * f(x_n)} \qquad (3)$$

The display unit 130A receives and displays the drawing data of the graph generated by the image drawing section 126, and also receives and displays, with the graph, the value of the area ratio R of the area S1 on the lower side of the graph, calculated by the area calculation section 128, to the total area S2, calculated by multiplying the maximum value of the total number of selections by the maximum value of the number of correct decisions.

Although, in the second embodiment, the image drawing section 126 receives an area ratio value calculated by the area calculation section 128 and transmits drawing data of the generated graph and the area ratio value received from the area calculation section 128 to the display unit 130A, other configurations may be employed. For example, the image drawing section 126 may receive an area ratio value calculated by the area calculation section 128 and communicate drawing data into which the generated graph and the area ratio value are drawn to the display unit 130A. The image drawing section 126 may, for example, communicate the generated graph to the display unit 130A, and the area calculation section 128 may communicate the calculated area ratio value to the display unit 130A.

The area calculation section 128 may, instead of receiving an instruction to start a calculation from the image drawing section 126, receive the instruction to start a calculation from the calculation section 124 and start the calculation of the area ratio.

2.2 Calculation Method of Area Ratio

Figure 13:
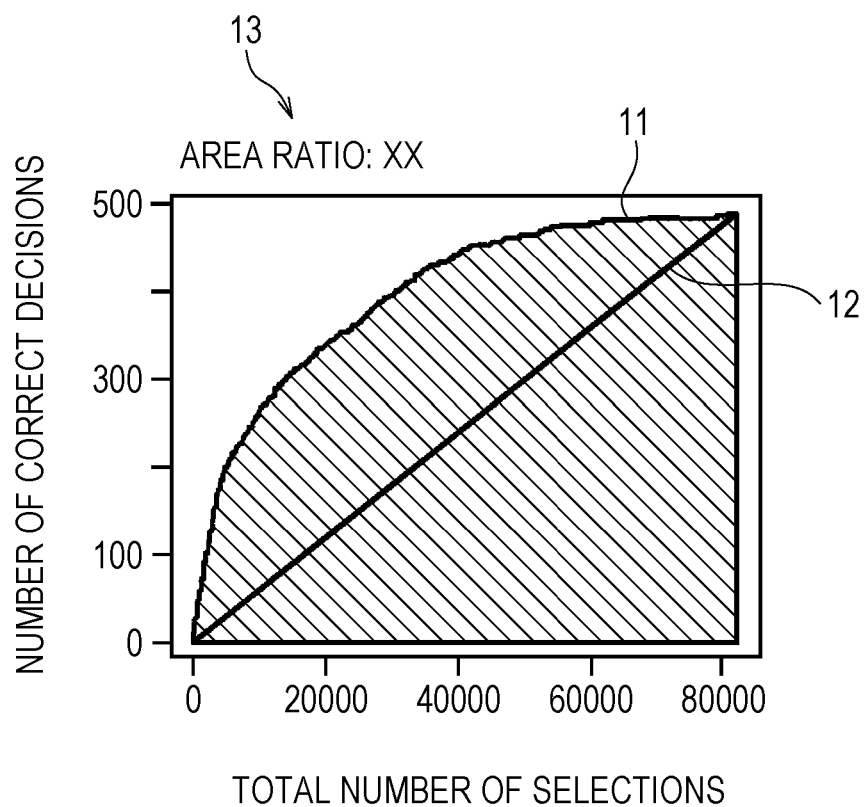
FIG. 13 is a diagram illustrating an example of a graph and an area ratio drawn by the evaluation result display method according to the second embodiment of the present disclosure.

FIG. 13 is a diagram illustrating an example of a graph and an area ratio drawn by the evaluation result display method according to the second embodiment of the present disclosure. The display unit 130A displays a graph 11 and an area ratio 13 illustrated in FIG. 13. The graph 11 is a graph which is created by plotting the number of correct decisions and the total number of selections, calculated by the calculation section 124, in a coordinate system with the vertical axis (y-axis) representing the number of correct decisions and the horizontal axis (x-axis) representing the total number of selections. The display unit 130A also displays a line 12 linking the origin (0, 0) with a point at which the total number of selections takes a maximum value and the number of correct decisions takes a maximum value.

Moreover, the display unit 130A displays the area ratio 13. The symbols "XX" drawn with the area ratio 13 in FIG. 13 indicate a numerical value which is actually calculated. The position where the area ratio 13 is drawn is not limited to any specific position.

The area on the lower side of the graph is an area of the shaded portion in FIG. 13. The total area is an area of a rectangle having the origin (0, 0) and a point with the maximum value of the total number of selections as an x-axis value and the maximum value of the number of correct decisions as a y-axis value as vertices thereof.

The area calculation section 128 calculates the area ratio based on the above-described formulae (1) to (3) and outputs a calculated value of the area ratio (calculated by dividing the area on the lower side of the graph by the total area).

2.3 Evaluation Result Display Method

Next, referring to FIG. 14, the evaluation result display method will be described.

Figure 14:
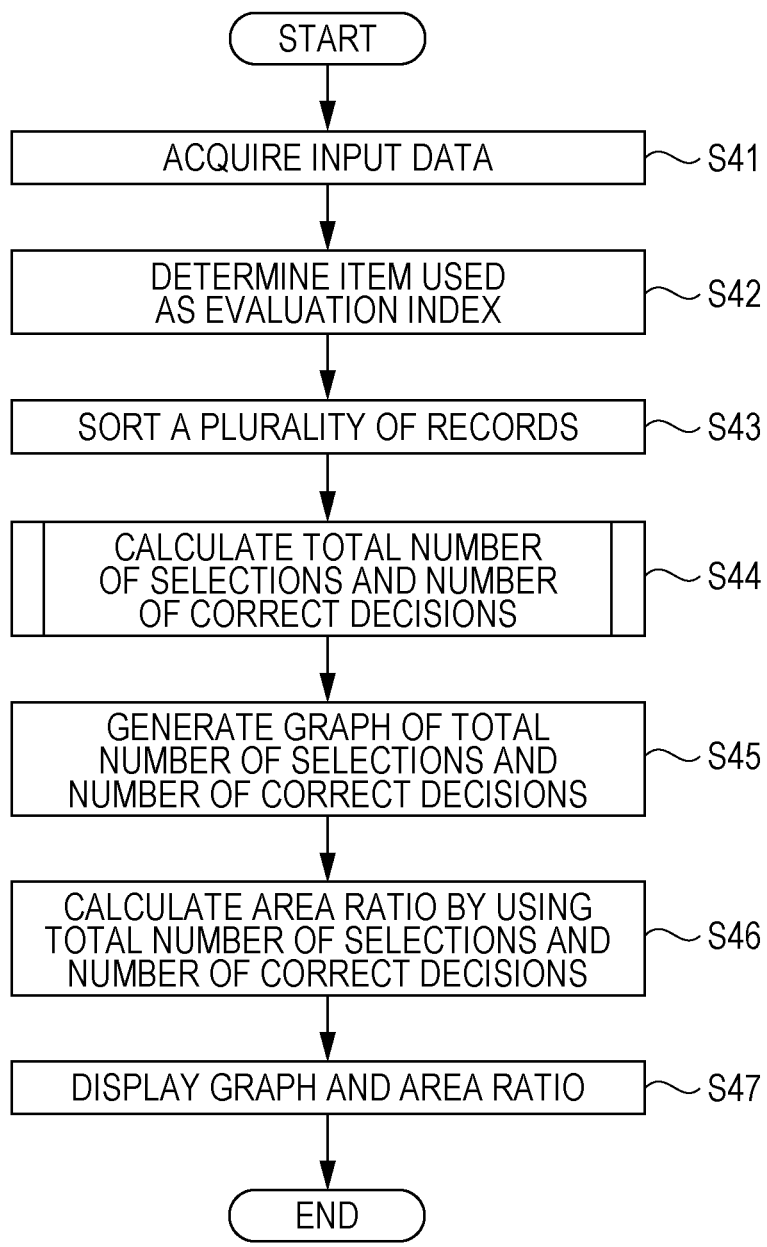
FIG. 14 is a flowchart illustrating a processing flow of the evaluation result display method according to the second embodiment of the present disclosure.

FIG. 14 is a flowchart illustrating a processing flow of the evaluation result display method according to the second embodiment of the present disclosure.

First, the acquisition section 121 acquires input data which are source data to display an evaluation result (step S41). The input unit 110 receives the input data which are source data to display the evaluation result and transmits the received input data to the acquisition section 121. The acquisition section 121 receives the input data transmitted by the input unit 110 and stores the received input data in the storage section 122.

Next, the sorting section 123 determines an item used as an evaluation index (step S42). In the determination, the input unit 110 receives an operation from a user and communicates the received operation instruction to the acquisition section 121. The acquisition section 121 receives the operation instruction communicated by the input unit 110 and communicates a start of processing to the sorting section 123.

Next, the sorting section 123 reads out the input data (a collection of a plurality of records) stored in the storage section 122 and sorts the read-out plurality of records based on the item used as an evaluation index (step S43). In this processing, the item used as an evaluation index is a browsing probability (prediction probability) value predicted by a prediction model. The sorting section 123 sorts the plurality of records in descending order of the browsing probability. The sorting section 123 stores the sorted plurality of records in the storage section 122.

Next, the calculation section 124, with respect to the collection of the plurality of records sorted by the sorting section 123, reads out records in order from the head record and calculates the total number of selections and the number of correct decisions (step S44). The calculation section 124 associates the calculated value of the total number of selections with the calculated value of the number of correct decisions and stores the values in the storage section 122. The processing to calculate the total number of selections and the number of correct decisions in step S44 is exemplified in FIGS. 9, 10, and 11.

Next, the image drawing section 126 reads out combinations of the total number of selections and the number of correct decisions stored in the storage section 122 and generates a graph which is created by plotting the read-out combinations of the total number of selections and the number of correct decisions in a coordinate system with the vertical axis (y-axis) representing the number of correct decisions and the horizontal axis (x-axis) representing the total number of selections (step S45). The image drawing section 126 instructs the area calculation section 128 to start a calculation of an area ratio.

Next, the area calculation section 128 receives the instruction from the image drawing section 126 and, by using the total number of selections and the number of correct decisions calculated by the calculation section 124, calculates an area ratio of the area on the lower side of the graph, calculated by the area calculation section 128, to the total area, calculated by multiplying a maximum value of the total number of selections by a maximum value of the number of correct decisions (step S46). The area calculation section 128 returns the area ratio value, which is a calculation result, to the image drawing section 126. The image drawing section 126 transmits drawing data of the generated graph and the area ratio value received from the area calculation section 128 to the display unit 130A.

Last, the display unit 130A receives and displays the drawing data of the graph generated by the image drawing section 126, and also receives and displays, with the graph, the area ratio value calculated by the area calculation section 128 (step S47).

2.4 Advantageous Effect

As described above, according to the second embodiment of the present disclosure, it is possible to appropriately display an evaluation of a prediction result in a graph by calculating only the total number of selections and the number of correct decisions. With this method, it is possible to reduce an amount of memory usage required for a calculation of an evaluation result compared with a conventional evaluation result display method in which all data are checked and both TP rates and FP rates are calculated in order.

In other words, although, in the conventional evaluation result display method, it is necessary to store three parameters, namely the total number of selections, the number of correct decisions, and the number of wrong decisions, in a memory, in the evaluation result display method of the second embodiment, it is sufficient to store only two parameters, the total number of selections and the number of correct decisions, in the memory, and it is thus possible to reduce an amount of memory usage for a calculation of an evaluation result.

The evaluation result display method and the evaluation result display apparatus of the second embodiment of the present disclosure make it possible to not only reduce an amount of memory usage but also shorten processing time in an evaluation of a prediction result, in particular, for significantly biased data.

According to the second embodiment of the present disclosure, it is possible to calculate an area ratio of an area on the lower side of a graph to the total area calculated by multiplying a maximum value of the total number of selections by a maximum value of the number of correct decisions by using the total number of selections and the number of correct decisions which are calculated to display a graph of an evaluation result, and use the calculated area ratio as an index to objectively evaluate a prediction model. It is possible to decide that a prediction model with a high area ratio is a better prediction model compared with a prediction model with a low area ratio. Because numerical values, namely area ratios, are compared, it becomes possible to objectively evaluate a prediction model.

Third Embodiment

In the second embodiment, a method to reduce an amount of memory usage, display an evaluation result of a prediction model, and display an index (area ratio) to objectively evaluate a prediction model was described. However, it is preferable to determine which group (a group of persons who browse an advertisement and a group of persons who do not browse the advertisement, in this disclosure) an object belongs to, eventually.

Accordingly, in the third embodiment, a method to determine which group, among a plurality of groups, an object belongs to will be described. Specifically, for each of the calculated total numbers of selections and each of the calculated numbers of correct decisions, the total number of selections for which the agreement rate between an actual result and a predicted result when it is supposed that all groups to which records that have been already selected belong are predicted to be the correct decision with a value of "1" and all groups to which records that have not been selected yet belong are predicted to be the wrong decision with a value of "0" takes a maximum value is calculated. In an evaluation result display method of the third embodiment, the total number of selections (optimum value) for which the agreement rate with an actual result takes a maximum value is calculated and displayed with a graph.

3.1 Configuration of Apparatus Carrying Out Evaluation Result Display Method

Figure 15:
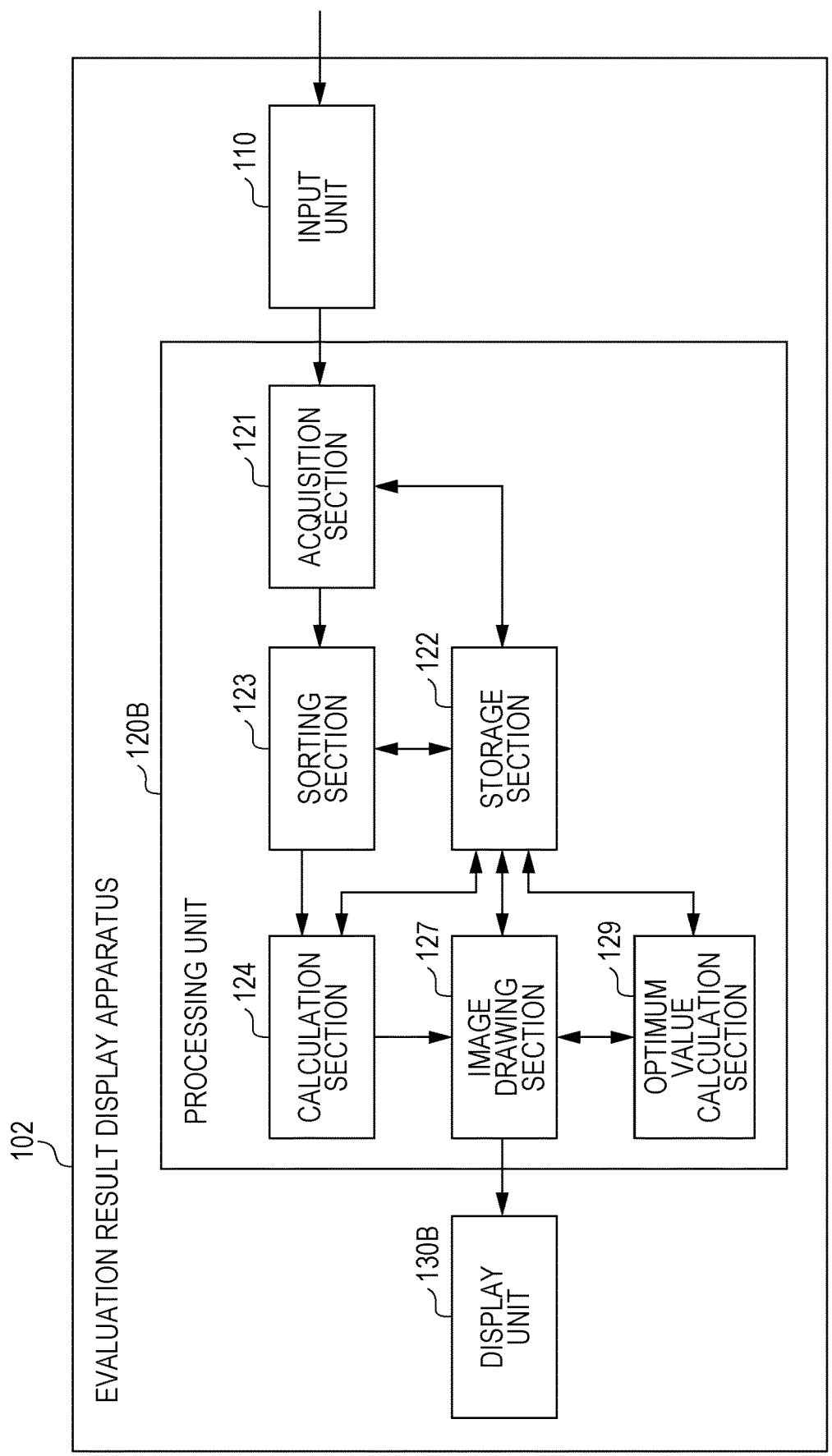
FIG. 15 is a block diagram illustrating a functional configuration of a system for carrying out an evaluation result display method according to a third embodiment of the present disclosure.

FIG. 15 is a block diagram illustrating a functional configuration of a system for carrying out an evaluation result display method according to the third embodiment of the present disclosure. FIG. 15 illustrates a case in which the system for carrying out the evaluation result display method is configured as an apparatus.

The evaluation result display apparatus 102 illustrated in FIG. 15 includes an input unit 110, a processing unit 120B, and a display unit 130B. The evaluation result display apparatus 102 illustrated in FIG. 15 differs from the configuration illustrated in FIG. 5 with respect to the processing unit 120B and the display unit 130B.

The processing unit 120B includes an acquisition section 121, a storage section 122, a sorting section 123, a calculation section 124, an image drawing section 127, and an optimum value calculation section 129. The processing unit 120B, in addition to the configuration of the processing unit 120 in FIG. 5, includes the optimum value calculation section 129, and the image drawing section 127 has a different function from the function of the image drawing section 125 in FIG. 5. The acquisition section 121, the storage section 122, the sorting section 123, and the calculation section 124 included in the processing unit 120B have similar functions to the above-described functions of the acquisition section 121, the storage section 122, the sorting section 123, and the calculation section 124 in FIG. 5, respectively. In FIG. 15, components similar to corresponding components in FIG. 5 have identical reference characters, and description of such components will be omitted.

The image drawing section 127 reads out combinations of the total number of selections and the number of correct decisions stored in the storage section 122 and generates a graph in a coordinate system with the vertical axis (y-axis) representing the number of correct decisions and the horizontal axis (x-axis) representing the total number of selections. The image drawing section 127 instructs the optimum value calculation section 129 to start a calculation of an optimum value and receives the optimum value, which is a calculation result, from the optimum value calculation section 129. The image drawing section 127 transmits drawing data of the generated graph and the optimum value received from the optimum value calculation section 129 to the display unit 130B. The graph is drawn in a form of line graph which is created by plotting lines linking points with adjacent coordinate values (the total number of selections as an x-axis value and the number of correct decisions as a y-axis value) with each other. The graph may be drawn in a form of point graph which is created by plotting points with coordinate values (the total number of selections as an x-axis value and the number of correct decisions as a y-axis value). Furthermore, the image drawing section 127 may draw a line which links the origin (0, 0), which is a point at which the number of correct decisions takes 0 and the total number of selections takes 0, with a point at which the number of correct decisions takes the maximum value and the total number of selections takes the maximum value, that is, a point expressing a value when all data are selected, of the graph by superimposing the line in the coordinate system. This line expresses the total number of selections and the number of correct decisions when data are selected at random.

The optimum value calculation section 129 calculates, as an optimum value, the total number of selections of a point on the graph where the slope of the line, which links the point at which the total number of selections takes 0 and the number of correct decisions takes 0 with the point at which the total number of selections takes the maximum value and the number of correct decisions takes the maximum value, coincides with the slope of the generated graph, by using the number of selections and the number of correct decisions output by the calculation section 124, and outputs the calculated optimum value.

The optimum value calculation section 129, with respect to each of the total numbers of selections calculated by the calculation section 124, calculates, as an optimum value, the total number of selections for which the agreement rate between an actual result and a predicted result when it is supposed that data that have been already selected are predicted to be the correct decision (the actual result has a value of "1") and data that have not been selected yet are predicted to be the wrong decision (the actual result has a value of "0") takes a maximum value. The optimum value calculation section 129 receives the instruction to start a calculation from the image drawing section 127, calculates the optimum value, and returns the optimum value, which is a calculation result, to the image drawing section 127.

Specifically, the graph generated by the image drawing section 127 is drawn in a form of line graph which is created by plotting lines linking points with coordinate values (the total number of selections as an x-axis value and the number of correct decisions as a y-axis value) calculated by the calculation section 124 with each other. The optimum value is a value (the total number of selections) of a tangent point between the graph and a tangent line that has the same slope as the slope of an additional line expressing a relation between the total number of selections and the number of correct decisions when data are selected at random. A case in which the slope of a tangent line of the graph is larger than the slope of the additional line indicates that a rate of correct decision is increasing, and a case in which the slope of a tangent line of the graph is smaller than the slope of the additional line indicates that the rate of correct decision decreases compared with a case in which data are selected at random. Therefore, the optimum value is the total number of selections at a tangent point between the graph and a tangent line that has the same slope as the slope of the additional line.

The value of the additional line is calculated based on the following formula (4). In the following formula (4), $x_i$ denotes the number of correct decisions, $g(x_i)$ denotes the total number of selections on the additional line, and n denotes the number of points.

$$g(x_i) = \frac{f(x_n)}{x_n} * x_i \quad (4)$$

Because the optimum value is a maximum value of the difference between the value of the graph expressing the number of correct decisions and the value of the additional line, the optimum value calculation section 129 calculates the optimum value based on the following formula (5). In the following formula (5), $x_i$ denotes the number of correct decisions, $f(x_i)$ denotes the total number of selections of the graph, and $g(x_i)$ denotes the total number of selections on the additional line.

$$\text{Optimum value} = \max_i (f(x_i) - g(x_i)) \quad (5)$$

The display unit 130B receives and displays drawing data of the graph generated by the image drawing section 126, and also receives and displays, with the graph, the optimum value calculated by the optimum value calculation section 129.

Although, in the third embodiment, the image drawing section 127 receives the optimum value calculated by the optimum value calculation section 129 and transmits the drawing data of the generated graph and the optimum value received from the optimum value calculation section 129 to the display unit 130B, other configurations may be employed. For example, the image drawing section 127 may receive the optimum value calculated by the optimum value calculation section 129 and communicate drawing data into which the generated graph and the optimum value are drawn to the display unit 130B. The image drawing section 127 may, for example, communicate the generated graph to the display unit 130B, and the optimum value calculation section 129 may communicate the calculated optimum value to the display unit 130B.

The optimum value calculation section 129 may, instead of receiving an instruction to start a calculation from the image drawing section 127, receive the instruction to start a calculation from the calculation section 124 and start a calculation of the optimum value.

3.2 Calculation Method of Optimum Value

Next, referring to FIG. 16, a calculation method of the optimum value according to the third embodiment of the present disclosure will be described.

Figure 16:
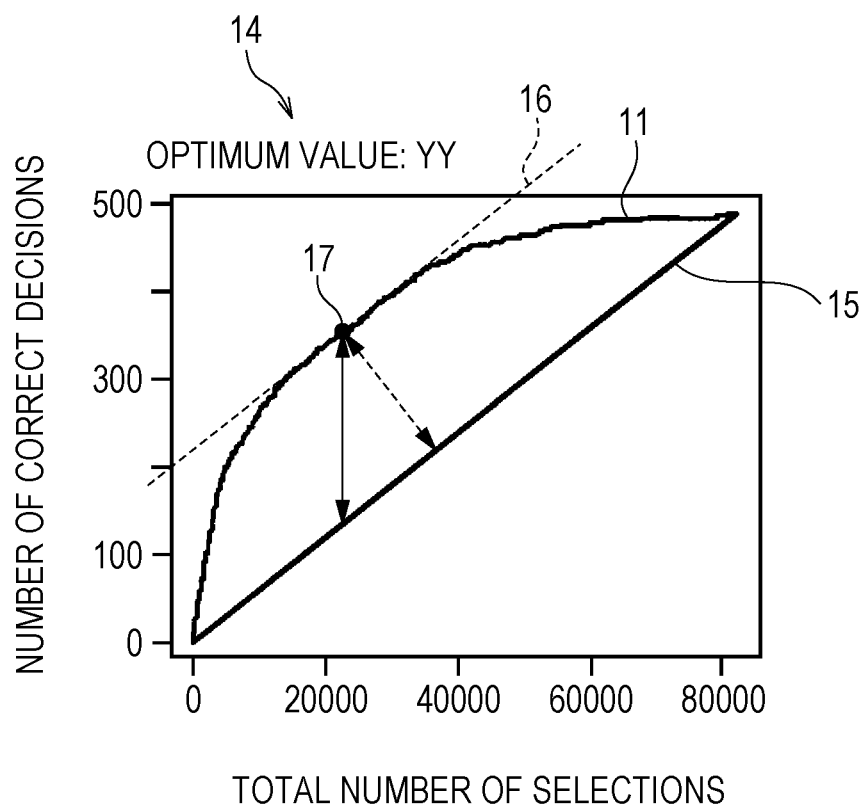
FIG. 16 is a diagram illustrating an example of a graph and an optimum value drawn by the evaluation result display method according to the third embodiment of the present disclosure.

FIG. 16 is a diagram illustrating an example of a graph and an optimum value drawn by using the evaluation result display method according to the third embodiment of the present disclosure. The display unit 130B displays a graph 11 and an optimum value 14 illustrated in FIG. 16. The graph 11 is a graph created by plotting the number of correct decisions and the total number of selections calculated by the calculation section 124 in a coordinate system with the vertical axis (y-axis) representing the number of correct decisions and the horizontal axis (x-axis) representing the total number of selections. The display unit 130B also displays an additional line 15 which links the origin (0, 0) with a point at which the total number of selections takes a maximum value and the number of correct decisions takes a maximum value.

Furthermore, the display unit 130B displays an optimum value 14. The symbols "YY" displayed as the optimum value 14 in FIG. 16 express an actually calculated numerical value. The position where the optimum value 14 is displayed is not limited to any specific position.

The optimum value is the total number of selections at a tangent point 17 between the graph 11 plotted by the image drawing section 127 and a tangent line 16 that has the same slope as the slope of an additional line 15, which expresses the total number of selections and the number of correct decisions when data are selected at random. Specifically, when the slope of the tangent line 16 of the graph 11 is larger than the slope of the additional line 15, the rate of correct decision increases, and, when the slope of the tangent line 16 of the graph 11 is smaller than the slope of the additional line 15, the rate of correct decision decreases compared with a case in which data are selected at random. In consequence, the optimum value is the total number of selections at the tangent point 17 between the graph 11 and the tangent line 16 which is parallel to the additional line 15. The tangent point 17 is a point on the graph 11 at which, with respect to the total number of selections, the difference between the number of correct decisions of the drawn graph 11 and the number of correct decisions of the additional line 15 takes a maximum value.

The optimum value calculation section 129 calculates the optimum value based on the above formulae (4) and (5) and outputs the calculated optimum value.

3.3 Evaluation Result Display Method

Next, referring to FIG. 17, the evaluation result display method will be described.

Figure 17:
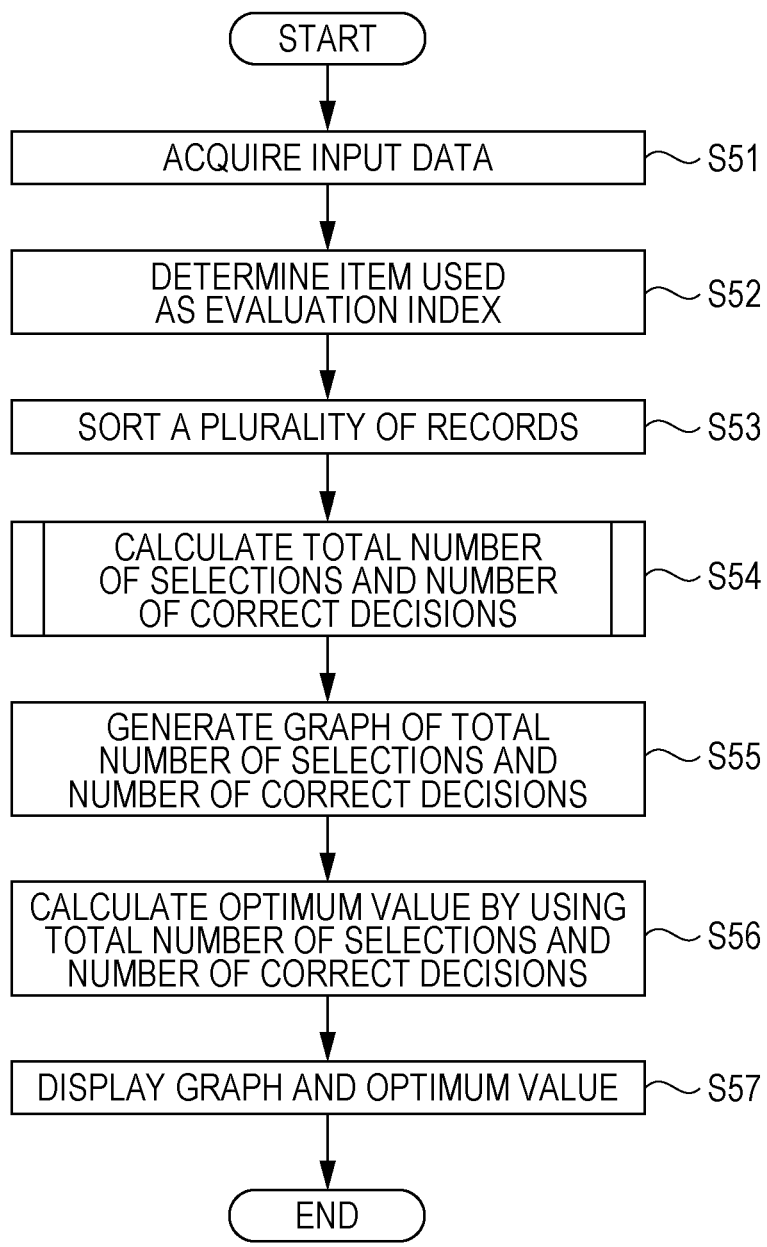
FIG. 17 is a flowchart illustrating a processing flow of the evaluation result display method according to the third embodiment of the present disclosure.

FIG. 17 is a flowchart illustrating a processing flow of the evaluation result display method according to the third embodiment of the present disclosure.

First, the acquisition section 121 acquires input data which are source data to display an evaluation result (step S51). The input unit 110 receives the input data which are source data to display an evaluation result and transmits the received input data to the acquisition section 121. The acquisition section 121 receives the input data transmitted by the input unit 110 and stores the received input data in the storage section 122.

Next, the sorting section 123 determines an item used as an evaluation index (step S52). In the determination, the input unit 110 receives an operation from a user and communicates the received operation instruction to the acquisition section 121. The acquisition section 121 receives the operation instruction communicated by the input unit 110 and communicates a start of processing to the sorting section 123.

Next, the sorting section 123 reads out the input data (a collection of a plurality of records) stored in the storage section 122 and sorts the read-out plurality of records based on the item used as an evaluation index (step S53). In this processing, the item used as an evaluation index is a browsing probability (prediction probability) value predicted by the prediction model. The sorting section 123 sorts the plurality of records in descending order of the browsing probability. The sorting section 123 stores the sorted plurality of records in the storage section 122.

Next, the calculation section 124, with respect to the plurality of records sorted by the sorting section 123, reads out the records in order from the head record and calculates the total number of selections and the number of correct decisions (step S54). The calculation section 124 associates the calculated values of the total number of selections with the calculated values of the number of correct decisions and stores the values in the storage section 122. The processing to calculate the total number of selections and the number of correct decisions in step S54 is exemplified in FIGS. 9, 10, and 11.

Next, the image drawing section 127 reads out combinations of the total number of selections and the number of correct decisions stored in the storage section 122 and generates a graph which is created by plotting the read-out total number of selections and the read-out number of correct decisions in a coordinate system with the vertical axis (y-axis) representing the number of correct decisions and the horizontal axis (x-axis) representing the total number of selections (step S55). The image drawing section 127 instructs the optimum value calculation section 129 to start calculating an optimum value.

Next, the optimum value calculation section 129 receives the instruction from the image drawing section 127 and, by use of the total number of selections and the number of correct decisions calculated by the calculation section 124, calculates, as an optimum value, the total number of selections for which the agreement rate with an actual result takes a maximum value (step S56). The optimum value calculation section 129 returns the optimum value, which is a calculation result, to the image drawing section 127. The image drawing section 127 transmits drawing data of the generated graph and the optimum value received from the optimum value calculation section 129 to the display unit 130B.

Last, the display unit 130B receives and displays the drawing data of the graph generated by the image drawing section 127, and also receives and displays, with the graph, the optimum value calculated by the optimum value calculation section 129 (step S57).

3.4 Advantageous Effect

As described above, according to the third embodiment of the present disclosure, it is possible to appropriately display an evaluation of a prediction result in a graph by calculating only the total number of selections and the number of correct decisions. With this method, compared with a conventional evaluation result display method in which all data are checked and both TP rates and FP rates are calculated in order, it is possible to reduce an amount of memory usage required for a calculation of an evaluation result.

In other words, although, in conventional evaluation result display methods, it is required to store three parameters, namely the total number of selections, the number of correct decisions, and the number of wrong decisions, in a memory, in the evaluation result display method of the third embodiment, it is sufficient to store only two parameters, the total number of selections and the number of correct decisions, in the memory, and it is thus possible to reduce an amount of memory usage required to calculate an evaluation result.

The evaluation result display method and the evaluation result display apparatus of the third embodiment of the present disclosure make it possible to not only reduce an amount of memory usage but also shorten processing time in an evaluation of a prediction result, in particular, for significantly biased data.

According to the third embodiment of the present disclosure, it is possible, by use of the total number of selections and the number of correct decisions calculated to display a graph of an evaluation result, to calculate, as an optimum value, the total number of selections for which the agreement rate with an actual result takes a maximum value. Using the total number of selections and the number of correct decisions makes it possible to reduce an amount of memory usage for a calculation of the optimum value. Using this optimum value makes it possible to identify a prediction model that provides a highest rate of correct decision.

The evaluation result display method, the evaluation result display apparatus, and the non-transitory computer-readable recording medium storing an evaluation result display program according to the present disclosure make it possible to not only reduce an amount of memory usage but also easily evaluate a prediction result, and are useful as an evaluation result display method, an evaluation result display apparatus, and a non-transitory computer-readable recording medium storing an evaluation result display program that displays an evaluation result for a prediction model to predict which group, among a plurality of groups, each of a plurality of objects belongs to. The evaluation result display method, the evaluation result display apparatus, and the non-transitory computer-readable recording medium storing the evaluation result display program can be used for the purpose of browsing prediction on an advertisement, purchase prediction for customers, development prediction for a disease, or the like.

What is claimed is:

1. A method for reducing processor memory usage and processing time, comprising:
   acquiring a plurality of records which are a collection of records each of which includes a value of the probability that each of a plurality of users of a network browses an advertisement, and a value indicating whether each user actually browsed the advertisement, wherein the value indicating whether each user actually browsed the advertisement is a first value for a user actually browsing the advertisement, and is a second value for a user who did not actually browse the advertisement;

storing the acquired plurality of records in a memory;

reading out the acquired plurality of records from the memory, sorting the plurality of records in a sorted order based on the probability values, and storing the sorted plurality of records in the memory;

selecting a number of the plurality of sorted and stored plurality of records;

identifying from the acquired plurality of records only the number of the selected records, and
a number of the selected plurality of sorted and stored plurality of records in which users actually browsed the advertisement based on the stored value indicating whether each user actually browsed the advertisement, refraining from displaying a number of the selected plurality of sorted and stored plurality of records in which the users did not browse the advertisement, based on the stored value indicating whether each user actually browsed the advertisement;

storing the identified number of selected records and the identified number of the selected records in which users actually browsed the advertisement in association with each other;

outputting the stored and associated identified number of selected records and identified number of the selected records in which users actually browsed the advertisement, and controlling a display panel with a processor according to the outputted stored and associated identified number of selected records and identified number of the selected records in which users actually browsed the advertisement to display on the display panel an x-y graph displaying the identified number of the selected records in which users actually browsed the advertisement along the vertical axis of the graph, and displaying the identified number of selected records along the horizontal axis of the graph, in a coordinate system to display the graph.

2. The method according to claim 1,
wherein the sorting sorts the records based on the probability values,
wherein the sorting sorts the records in descending order of the probability values or in ascending order of the probability values.

3. The method according to claim 1,
further comprising generating the graph by plotting a line that links a point at which the number of selected records takes 0 and a number of correct decisions representing the number of users actually browsing the advertisement takes 0 with a point at which the number of selected records takes a maximum value and the number of correct decisions takes a maximum value in the coordinate system, and displaying the line.

4. The method according to claim 1, further comprising selecting a predetermined number of the records at a time and determining the number of selections of the predetermined number of the selected records and a number of correct decisions representing the number of users actually browsing the advertisement of the predetermined number of the selected records.

5. The method according to claim 1,
the sorting sorts the records based on the probability values, and
the selecting selects among the records sorted in the sorting, all the records that have the same probability value in sorted order and the identifying identifies the number of selections of the selected records having the same probability value and a number of correct decisions representing the number of users actually browsing the advertisement of the selected records having the same probability value.

6. The method according to claim 1, further comprising:
determining, with a processor, a number of selected records of a point on the graph at which a slope of a line that links a point at which the number of selected records takes 0 and a number of correct decisions representing the number of users actually browsing the advertisement takes 0 with a point at which the number of selected records takes a maximum value and the number of correct decisions takes a maximum value coincides with a slope of a tangent line of the generated graph, the number of selected records at the point on the graph being an optimum value, by using the number of selected records and the number of correct decisions output in the outputting, and
controlling the display panel with the processor to display the determined optimum value.

7. The method according to claim 1, further comprising displaying an index of a function f on the x-y graph with the display panel, wherein the displayed index is determined by using formulas (1)-(3),
wherein formula (1) is $$S1 = \sum_{i=1}^{n-1} \frac{(f(x_{i+1}) + f(x_i))(x_{i+1} - x_i)}{2} \quad (1)$$

where S1 is the area below the graph of the function, $x_i$ denotes a number of correct decisions representing the number of users actually browsing the advertisement, $f(x_i)$ denotes the total number of selected records, and n denotes the number of points,
wherein formula (2) is $$S2 = x_n * f(x_n) \quad (2)$$

where S2 is the area of a rectangle displayed on the x-y graph whose vertices include an origin of the graph, a point along the horizontal axis representing the maximum value of the total number of selected records, and a point along the vertical axis representing a maximum value of the number of correct decisions, $x_n$ denotes the maximum value of the total number of correct decisions, and $f(x_n)$ denotes the maximum value of the total number of selections, and
wherein formula (3) is $$R = \frac{S1}{S2} = \frac{\sum_{i=1}^{n-1} \frac{(f(x_{i+1}) + f(x_i))(x_{i+1} - x_i)}{2}}{x_n * f(x_n)} \quad (3)$$

where R is the displayed index, and wherein the displayed index represents an objective evaluation of a prediction model based on the graph, wherein the greater the displayed index, the better the prediction model.

8. The method according to claim 1,
the processor adjusts the graph so that the number of users who actually browsed the advertisement displayed along the vertical axis and the identified number of selected records displayed along the horizontal axis have a ratio of 1:1, and the displaying of the x-y graph displays the number of users who actually browsed the advertisement displayed along the vertical axis and the identified number of selected records displayed along the horizontal axis in a ratio of 1:1.

9. The method according to claim 1,
wherein the displaying of the graph also displays a line representing the identified number of selected records and the number of users who actually browsed the advertisement displayed when the identified number of selected records and the number of users who actually browsed the advertisement are selected at random,
wherein the displayed line links the origin of the x-y graph with a point at which the identified number of selected records takes a maximum value and the number of users who actually browsed the advertisement takes a maximum value, and
the higher the graph of the number of users who actually browsed the advertisement displayed along the vertical axis and of the identified number of selected records displayed along the horizontal axis above the line, the better a prediction model based on the number of users who actually browsed the advertisement and the identified number of selected records.

10. The method according to claim 1, further comprising displaying on the display panel an index of the x-y graph, wherein
the index is numerical value representing an objective evaluation of a prediction of whether users will browse the webpage based on the displayed x-y graph, and
the numerical value being a ratio of an area below the graph to an area of a rectangle whose vertices include an origin of the graph, a point along the horizontal axis representing the maximum value of the total number of selections, and a point along the vertical axis representing a maximum value of the number of correct decisions,
thereby providing a single screen displaying both the graph and the numerical value representing an evaluation of a prediction of whether users will browse the webpage based on the displayed x-y graph.

11. The method according to claim 1, wherein the first value indicating that each user actually browsed the advertisement is 1 and the second value indicating each user did not actually browse the advertisement is 0.

12. The method according to claim 1, wherein
the selecting operation comprises:
selecting a number of the plurality of sorted and stored plurality of records by selecting one record at a time,
the identifying operation of identifying from the acquired plurality of records only the number of the selected records comprises:
identifying only the total number of the selected records, which increases by one each time the selecting operation selects a record, and
the displaying of the identified number of selected records along the horizontal axis of the graph comprises:
displaying the total identified number of selected records along the horizontal axis of the graph, which increases by one when the selecting operation selects a record in a coordinate system to display the graph.

13. The method according to claim 1, wherein
the selecting operation selecting a number of the plurality of sorted and stored plurality of records comprises:
selecting a number of the plurality of sorted and stored plurality of records by selecting a plurality of record at a time,
the identifying operation identifying from the acquired plurality of records only the number of selected records comprises:
identifying only the total number of the selected records, which increases by the selected plurality of records when the selecting operation is performed, and
the displaying operation along the horizontal axis comprises:
displays the total identified number of selected records along the horizontal axis of the graph, which increases by the selected plurality of records when the selecting operation is performed in a coordinate system to display the graph.

14. The method according to claim 1, wherein
the selecting operation comprises:
selecting among the sorted plurality of records all the records having the same probability that each of the plurality of users browses the advertisement, and
the identifying operation comprises:
identifying from the acquired plurality of records having the same probability that each of the plurality of users browses the advertisement only the number of the selected records having the same probability that each of the plurality of users browses the advertisement.

15. A computing device for reducing processor memory usage and processing time comprising:
a display panel;
a memory; and
a processor,
the processor being configured to control the memory and the display panel, according to instructions stored in the memory, to
acquire a plurality of records which are a collection of records each of which includes a value of the probability that each of a plurality of users of a network browses an advertisement, and a value indicating whether each user actually browsed the advertisement, wherein the value indicating whether each user actually browsed the advertisement is a first value for a user actually browsing the advertisement, and is a second value for a user who did not actually browse the advertisement;
store the acquired plurality of records in the memory;
read out the acquired plurality of records from the memory, sort the plurality of records in a sorted order based on the probability values, and store the sorted plurality of records in the memory;
select a number of the plurality of sorted and stored plurality of records;
identify from the acquired plurality of records only
the number of the selected records, and
a number of the selected plurality of sorted and stored plurality of records in which users actually browsed the advertisement based on the stored value indicating whether each user actually browsed the advertisement,
refrain from displaying a number of the selected plurality of sorted and stored plurality of records in which the users did not browse the advertisement, based on the stored value indicating whether each user actually browsed the advertisement;
store the identified number of selected records and the identified number of the selected records in which users actually browsed the advertisement in association with each other;

output the stored and associated identified number of selected records and identified number of the selected records in which users actually browsed the advertisement, and control the display panel according to the outputted stored and associated identified number of selected records and the identified number of the selected records in which users actually browsed the advertisement to display on the display panel an x-y graph displaying the identified number of the selected records in which users actually browsed the advertisement along the vertical axis of the graph, and the identified number of selected records along the horizontal axis of the graph, in a coordinate system to display the graph.

16. The apparatus according to claim 15, further comprising displaying an index of a function f on the x-y graph with the display panel, wherein the displayed index is determined by using formulas (1)-(3), wherein formula (1) is $$S1 = \sum_{i=1}^{n-1} \frac{(f(x_{i+1}) + f(x_i))(x_{i+1} - x_i)}{2} \tag{1}$$

where S1 is the area below the graph of the function, $x_i$ denotes the number of correct decisions representing the number of users actually browsing the advertisement, $f(x_i)$ denotes the total number of selections, and n denotes the number of points, wherein formula (2) is $$S2 = x_n * f(x_n) \tag{2}$$

where S2 is the area of a rectangle displayed on the x-y graph whose vertices include an origin of the graph, a point along the horizontal axis representing the maximum value of the total number of selected records, and a point along the vertical axis representing a maximum value of the number of correct decisions, $x_n$ denotes the maximum value of the total number of correct decisions, and $f(x_n)$ denotes the maximum value of the total number of selected records, and wherein formula (3) is $$R = \frac{S1}{S2} = \frac{\sum_{i=1}^{n-1} \frac{(f(x_{i+1}) + f(x_i))(x_{i+1} - x_i)}{2}}{x_n * f(x_n)} \tag{3}$$

where R is the displayed index, and wherein the displayed index represents an objective evaluation of a prediction model based on the graph, wherein the greater the displayed index, the better the prediction model.

17. A non-transitory computer-readable recording medium storing a program causing a processor of a computer to reduce computer memory usage and processing time by:

acquiring a plurality of records which are a collection of records each of which includes a value of the probability that each of a plurality of users of a network browses an advertisement, and a value indicating whether each user actually browsed the advertisement, wherein the value indicating whether each user actually browsed the advertisement is a first value for a user actually browsing the advertisement, and is a second value for a user who did not actually browse the advertisement;

storing the acquired plurality of records in a memory;

reading out the acquired plurality of records from the memory, sorting the plurality of records in a sorted order based on the probability values, and storing the sorted plurality of records in the memory;

selecting a number of the plurality of sorted and stored plurality of records;

identifying from the acquired plurality of records only the number of the selected records, and a number of the selected plurality of sorted and stored plurality of records in which users actually browsed the advertisement based on the stored value indicating whether each user actually browsed the advertisement, refraining from displaying a number of the selected plurality of sorted and stored plurality of records in which the users did not browse the advertisement, based on the stored value indicating whether each user actually browsed the advertisement;

storing the identified number of selected records and the identified number of the selected records in which users actually browsed the advertisement in association with each other;

outputting the stored and associated identified number of selected records and identified number of the selected records in which users actually browsed the advertisement, and controlling a display panel with the processor according to instructions stored in the computer-readable recording medium and according to the outputted stored and associated identified number of selected records and identified number of the selected records in which users actually browsed the advertisement to display on the display panel an x-y graph, displaying the identified number of the selected records in which users actually browsed the advertisement along the vertical axis of the graph, and displaying the identified number of selected records along the horizontal axis of the graph, in a coordinate system to display the graph.

18. The non-transitory computer-readable recording medium according to claim 17, further comprising displaying an index of a function f on the x-y graph with the display panel, wherein the displayed index is determined by using formulas (1)-(3), wherein formula (1) is $$S1 = \sum_{i=1}^{n-1} \frac{(f(x_{i+1}) + f(x_i))(x_{i+1} - x_i)}{2} \tag{1}$$

where S1 is the area below the graph of the function, $x_i$ denotes the number of correct decisions representing the number of users actually browsing the advertisement, $f(x_i)$ denotes the total number of selected records, and n denotes the number of points, wherein formula (2) is $$S2 = x_n * f(x_n) \tag{2}$$

where S2 is the area of a rectangle displayed on the x-y graph whose vertices include an origin of the graph, a point along the horizontal axis representing the maximum value of the total number of selected records, and a point along the vertical axis representing a maximum value of the number of correct decisions, $x_n$ denotes the maximum value of the total number of correct decisions, and $f(x_n)$ denotes the maximum value of the total number of selections, and wherein formula (3) is $$R = \frac{S1}{S2} = \frac{\sum_{i=1}^{n-1} \frac{(f(x_{i+1}) + f(x_i))(x_{i+1} - x_i)}{2}}{x_n * f(x_n)} \quad (3)$$

where R is the displayed index, and wherein the displayed index represents an objective evaluation of a prediction model based on the graph, wherein the greater the displayed index, the better the prediction model.

19. A method for reducing processor memory usage and processing time, comprising:
- acquiring a plurality of records which are a collection of records each of which includes a value of the probability that each of a plurality of users of a network browses an advertisement, and a value indicating whether each user actually browsed the advertisement, wherein the value indicating whether each user actually browsed the advertisement is a first value for a user actually browsing the advertisement, and is a second value for a user who did not actually browse the advertisement;
- storing the acquired plurality of records in a memory;
- reading out the acquired plurality of records from the memory, sorting the plurality of records in a sorted order based on the probability values, and storing the sorted plurality of records in the memory;
- selecting a number of the plurality of sorted and stored plurality of records;
- refraining from displaying a number of the selected plurality of sorted and stored plurality of records in which the users did not browse the advertisement, based on the stored value indicating whether each user actually browsed the advertisement;
- storing the number of selected records and a number of the selected records in which users actually browsed the advertisement in association with each other; and
- outputting the stored and associated number of selected records and the stored number of the selected records in which users actually browsed the advertisement, and
- controlling a display panel with a processor according to the outputted stored and associated number of selected records and the outputted number of the selected records in which users actually browsed the advertisement to display on the display panel an x-y graph displaying the outputted number of the selected records in which users actually browsed the advertisement along the vertical axis of the graph, and displaying the outputted number of selected records along the horizontal axis of the graph, in a coordinate system to display the graph.

* * * * *